US012477229B2

(12) United States Patent
Dzitsiuk et al.

(10) Patent No.: US 12,477,229 B2
(45) Date of Patent: Nov. 18, 2025

(54) SYSTEMS AND METHODS FOR IMAGE CAPTURE

(71) Applicant: Hover Inc., San Francisco, CA (US)

(72) Inventors: Yevheniia Dzitsiuk, San Francisco, CA (US); Domenico Curro, San Francisco, CA (US); Siu Fai Chow, San Francisco, CA (US); Jeffrey Sommers, San Francisco, CA (US); Harsh Barbhaiya, San Francisco, CA (US)

(73) Assignee: Hover Inc., San Francisco, CA (US)

( * ) Notice: Subject to any disclaimer, the term of this patent is extended or adjusted under 35 U.S.C. 154(b) by 402 days.

(21) Appl. No.: 17/999,647

(22) PCT Filed: May 26, 2021

(86) PCT No.: PCT/US2021/034158
§ 371 (c)(1),
(2) Date: Nov. 22, 2022

(87) PCT Pub. No.: WO2021/242809
PCT Pub. Date: Dec. 2, 2021

(65) Prior Publication Data
US 2023/0239574 A1 Jul. 27, 2023

Related U.S. Application Data

(60) Provisional application No. 63/192,357, filed on May 24, 2021, provisional application No. 63/164,449, (Continued)

(51) Int. Cl.
*H04N 23/698* (2023.01)
*H04N 23/80* (2023.01)
*H04N 23/959* (2023.01)

(52) U.S. Cl.
CPC ........... *H04N 23/698* (2023.01); *H04N 23/80* (2023.01); *H04N 23/959* (2023.01)

(58) Field of Classification Search
CPC .... H04N 23/698; H04N 23/80; H04N 23/959; H04N 23/633; G06T 7/70; G06T 7/73; G06T 7/74; G06T 2207/20221
See application file for complete search history.

(56) References Cited

U.S. PATENT DOCUMENTS 10,585,344 B1 *  3/2020 Lablans ................. H04N 23/58
2007/0031062 A1   2/2007 Pal et al.
(Continued)

FOREIGN PATENT DOCUMENTS

EP        4154172 A1      3/2023
WO   WO 2014/193670 A2   12/2014
WO   WO 2021/242809 A1   12/2021

OTHER PUBLICATIONS

Brown et al., "Automatic Panoramic Image Stitching using Invariant Features," Journal of Computer Vision, vol. 74, dated Dec. 2006, pp. 59-73.
(Continued)

*Primary Examiner* — Kelly L Jerabek
(74) *Attorney, Agent, or Firm* — Knobbe, Martens, Olson & Bear, LLP

(57) ABSTRACT

Images subject to panoramic image stitching are analyzed for suitability in three dimensional construction. Effects of translation changes between cameras are mitigated. The dioptric relationship of subject content of the images to the camera set identifies camera translation changes, and eligible camera position inputs, permissible to avoid parallax errors. Images within permissible ranges of each other are stitched to create panoramic images of subject content that a camera cannot fully capture with a single image. Registration plane selection based on translation distances
(Continued)

between cameras, and permissible translation changes based on detected subject content depth are disclosed.

14 Claims, 35 Drawing Sheets

Related U.S. Application Data filed on Mar. 22, 2021, provisional application No. 63/029,792, filed on May 26, 2020.

(56) References Cited

U.S. PATENT DOCUMENTS

| | | | |
|---|---|---|---|
| 2012/0294549 A1 | 11/2012 | Doepke | |
| 2016/0212338 A1 | 7/2016 | Seok et al. | |
| 2017/0006220 A1* | 1/2017 | Adsumilli | G06V 10/40 |
| 2017/0178372 A1 | 6/2017 | Gormish et al. | |
| 2020/0020075 A1* | 1/2020 | Khwaja | G06T 5/70 |
| 2020/0126182 A1* | 4/2020 | Cho | H04N 23/698 |
| 2020/0294194 A1* | 9/2020 | Sun | H04N 23/698 |

OTHER PUBLICATIONS

Herrmann et al., "Robust Image Stitching with Multiple Registrations," In Proceedings of the European Conference on Computer Vision, dated Oct. 9, 2018, pp. 53-67.

International Search Report and Written Opinion in Application No. PCT/US21/34158 dated Oct. 18, 2021 in 12 pages.

Moussa et al., "A Fast Approach for Stitching of Aerial Images," International Archives of the Photogrammetry, Remote Sensing & Spatial Information Sciences, vol. XLI-B3, dated May 27, 2016, pp. 769-774.

Extended European Search Report in Application No. 21812689.4 dated Dec. 11, 2023 in 12 pages.

* cited by examiner

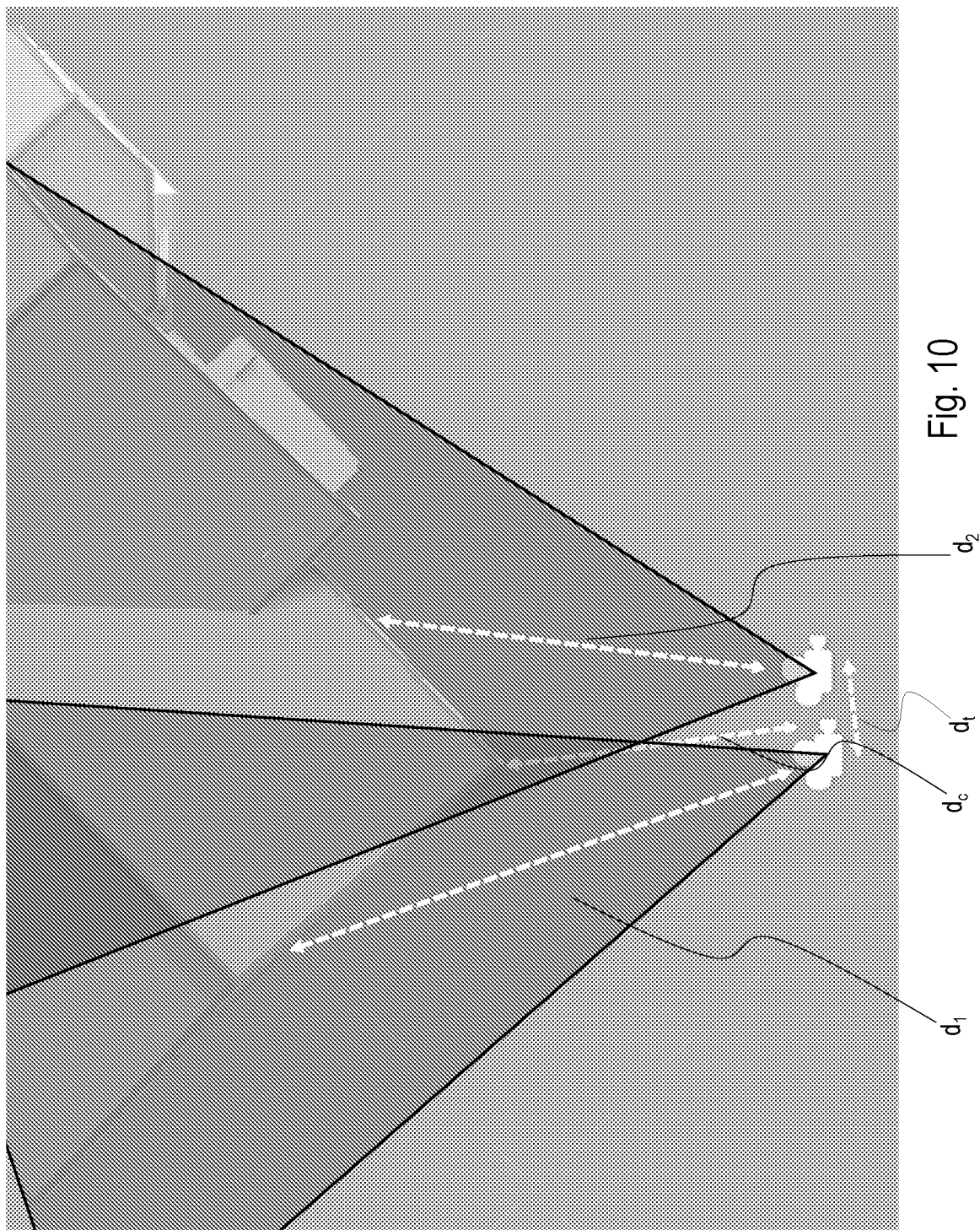

3 m between nearest point of the house and cameras, and 0 m between camera positions 3 m between nearest point of the house and cameras, and 0.5 m cumulative distance between camera positions

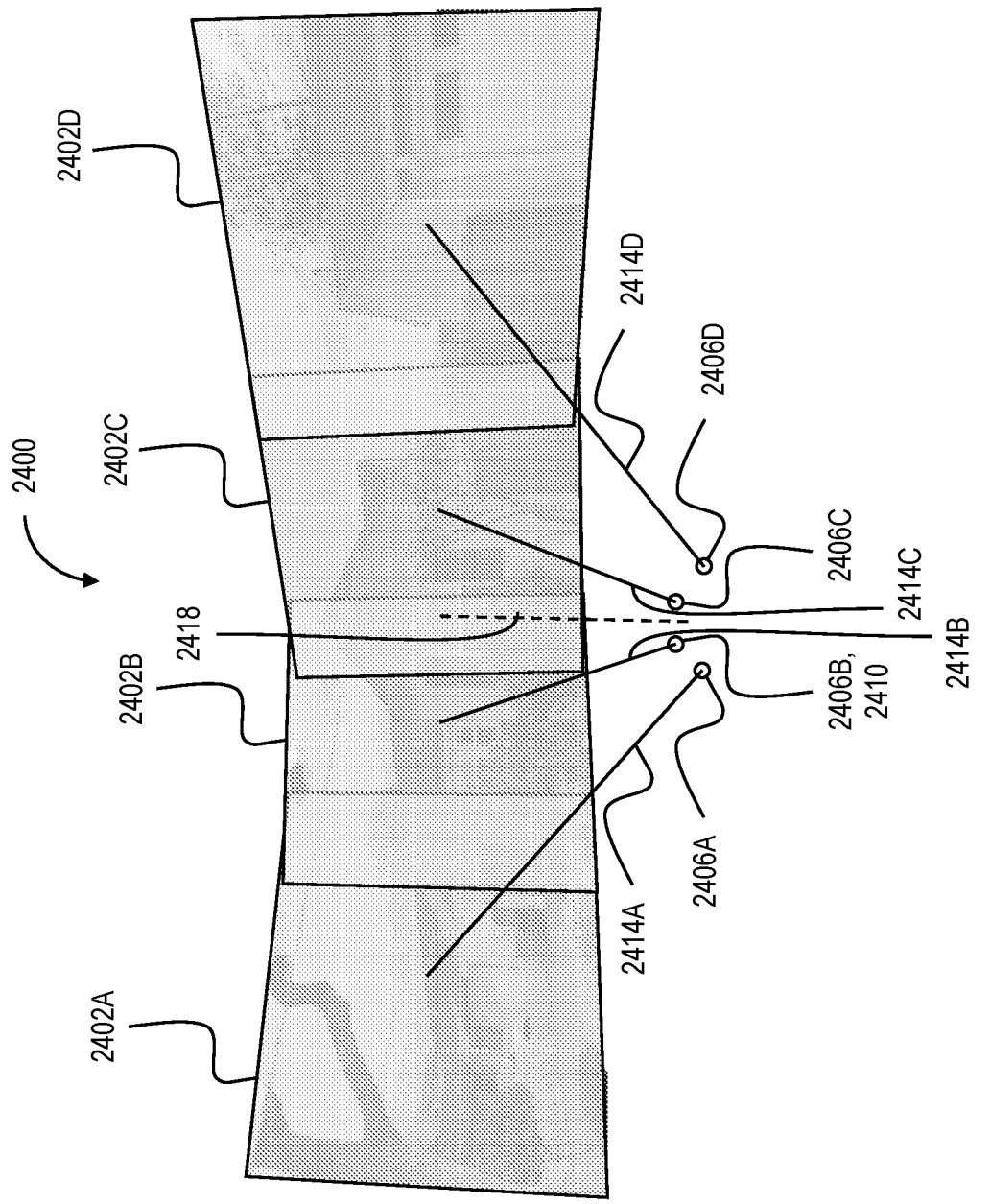

SYSTEMS AND METHODS FOR IMAGE CAPTURE

CROSS REFERENCE TO RELATED APPLICATIONS

The present application claim priority to U.S. Provisional Application No. 63/029,792, filed on May 26, 2020 entitled SYSTEMS AND METHODS FOR IMAGE CAPTURE, U.S. Provisional Application No. 63/164,449, filed on Mar. 22, 2021 entitled SYSTEMS AND METHODS FOR IMAGE CAPTURE, and U.S. Provisional Application No. 63/192,537, filed on May 24, 2021 entitled SYSTEMS AND METHODS FOR IMAGE CAPTURE, which are hereby incorporated by reference herein in their entirety.

FIELD OF THE INVENTION

This disclosure relates to panoramic image stitching and parallax mitigation in panoramic images.

BACKGROUND

Computer vision techniques and capabilities continue to improve. A limiting factor in any computer vision pipeline is the input image itself. Though camera quality metrics (such as image resolution) are advancing, camera viewfinder limitations in the form of field of view angular limits persist. A panoramic image is a single image created from a plurality of image frames at different positions, such that overlapping regions of the plurality of image frames align (typically after a warping step of the image) and a cohesive image (i.e., the panoramic image) of the subject is created with the information of the plurality of image frames. The total visual output, thus, represents data beyond what camera's field of view could provide in any one single image frame.

Changes in camera position, such as rotation, translation, or both, between the plurality of image frames introduce parallax artifacts and certain features in one image frame will appear to have shifted relative to another image frame. Previous attempts to create panoramic images that minimize parallax will place the camera in proximity to the subject being captured and limit camera rotation, such that there is no appreciable parallax effects between image frames. Other attempts will warp all image frames to a common registration plane. This registration plane can be that of a particular image frame, or a homography of all image frames, or a spatially variable registration. In these embodiments, at least the "seam areas" of overlapping regions across image frames are warped to align the desired content.

FIGS. 1A-1D illustrates various translation issues with warping an image to preserve certain content according to various techniques in the art. FIGS. 1A and 1B illustrate two images of different portions of content extending outside the limits of a camera field of view. FIG. 1C illustrates a first stitching technique, known as Autostitch, wherein the images are warped to align a first content (the strip of paper with the letters) resulting in misalignment and ghosting in the second content (the strip of paper with the numbers). FIG. 1D illustrates warping to multiple registration planes, and while both strips of paper are aligned, (i) the right portion of the strips have shifted rightward slightly thus breaking geometric representation of the ground truth in FIGS. 1A and 1B, (ii) the image content contains cropping (part of the scissors are cropped) and (iii) stitching artifacts in regions 110 manifest, which may be interpreted as actual lines by computer vision line extraction in downstream processes. Panoramic image generation and registration plane selection to preserve geometric relationships and maximize image data without ghosting or linear artifacts is needed.

BRIEF DESCRIPTION OF THE DRAWINGS

FIG. 10 illustrates variable distance calculations incident to variable geometries of a subject, according to some embodiments.

FIGS. 24A-24B illustrate a panoramic image, according to some embodiments.

Figure 1A:
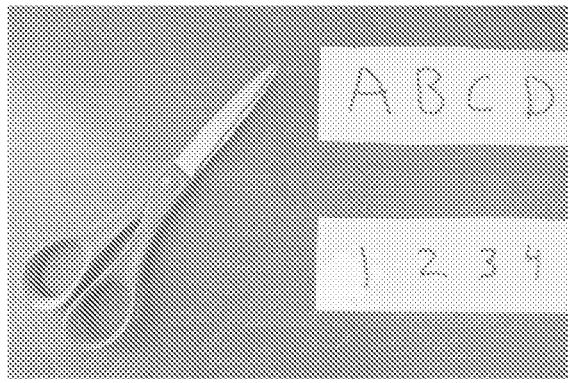
FIGS. 1A-D illustrates the prior art methods of image stitching and parallax errors involved.

The technology as described herein may have also been described, at least in part, in terms of one or more embodiments, none of which is deemed exclusive to the other. Various configurations may omit, substitute, or add various procedures or components as appropriate. For instance, in alternative configurations, the methods may be performed in an order different from that described, or combined with other steps, or omitted altogether. This disclosure is further non-limiting and the examples and embodiments described herein does not limit the scope of the invention.

It is further understood that modifications and changes to the disclosures herein are suggested to persons skilled in the art, and are included within the scope of this description and the appended claims.

SUMMARY

Described herein are various methods for generating geometrically consistent panoramic images from a plurality of images. Of note is that geometric consistency may produce images that preserve geometric relationships of content within images, despite visual output not resembling the original inputs. In other words, warping to maintain geometric alignments across images may produce panoramic stitches with proportion variations to the content of any one constituent image.

Though the field of photography and computer vision may broadly utilize the techniques described herein, specific discussion will be made using residential homes as the exemplary subject of an image capture, and photogrammetry and digital reconstruction the illustrative use cases for the panoramic images created.

Though image analysis techniques can produce a vast amount of information, for example classifying objects within an image frame or extracting elements like lines within a structure, they are nonetheless limited by the quality and scope of the original image. Images in low light conditions or poorly framed subjects may omit valuable information and preclude full exploitation of data in the image. Simple techniques such as zooming or cropping may correct for some framing errors, but not all, and editing effects such as simulated exposure settings may adjust pixels values to enhance certain aspects of an image, but such enhancement does not replace pixels that were never captured.

In still other examples, a poorly framed subject may not be the result of poor positioning of a camera's viewfinder; in some situations there is no camera position that can capture a full view of the intended subject/content. Though multiple images representing discrete areas of a subject may be captured and stand separate from the others, image processing techniques must act upon each image individually. The benefit of a panoramic image that incorporates multiple images into a stitched single image is efficient representation of data. In the case of three-dimensional reconstruction from images, this efficiency is invaluable.

Specific image processing techniques may require specific image inputs with specific data or features in those inputs; it is therefore desirable to capture a subject in a way that maximizes the potential to capture those inputs rather than rely on editing techniques in pre- or post-processing steps.

In three-dimensional (3D) modeling especially, two-dimensional (2D) images of a to-be-modeled subject can be of varying utility. For example, to construct a 3D representation of a residential building (e.g., exterior representation, interior representation, or both), a series of 2D images of the building (e.g., exterior, interior, or both) can be taken from various angles, such as from a smartphone, to capture various geometries and features of the building. Identifying corresponding features between images is critical to understand how the cameras that captured such images relate to one another, and to reconstruct the building in 3D space based on those corresponding features. Each additional image adds a correspondence step to the reconstruction. As the quantity of measurable or collectable (actionable) data within an image (or between images) decreases, the opportunity for incorrect or no correspondences among images increases.

This problem is compounded for ground-level images, as opposed to aerial or oblique images taken from a position above a subject. Ground-level images, such as ones captured by a smartphone without ancillary equipment like ladders or booms, are those with an optical axis from the imager to the subject that is substantially parallel to the ground surface. With such imagery, successive photos of the subject are prone to wide baseline rotation changes, and correspondences between images are less frequent without a coordinated image capture.

Figure 2:
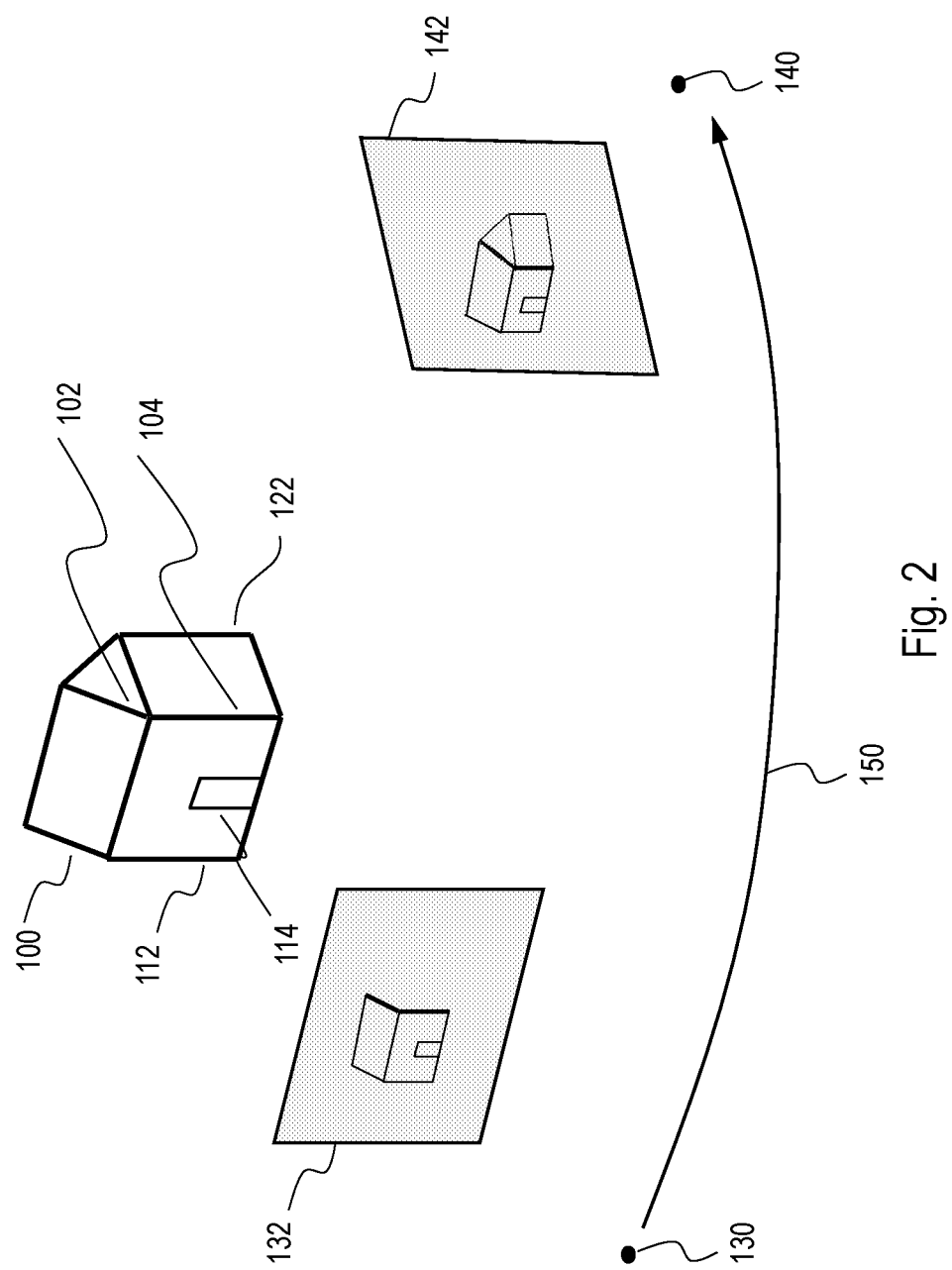
FIG. 2 illustrates ground level image capture and feature collection, according to some embodiments.

FIG. 2 illustrates this technical challenge for ground-level images in 3D reconstruction of an exterior representation of a subject. Subject 100 has multiple geometric features such as post 112, door 114, post 104, rake 102, and post 122. Each of these geometric features, as captured in images, represent useful data to understand how subject 100 is to be reconstructed. Not all of the features, however, are viewable from all camera positions. Camera position 130 views subject 100 through a frustum with viewing pane 132, and camera position 140 views subject 100 through a frustum with viewing pane 142. Camera position 130 is a substantially front facing image, and cannot see the side of subject 100, or features such as post 122. As the camera undergoes transition (e.g., rotation, translation, or both) 150 from camera position 130 to 140, additional features come into view at camera position 140 while maintaining observation of features from camera position 130. Continued transition (e.g., rotation, translation, or both) about subject 100 will place the camera at positions that it no longer observes features from previous image frames, shrinking the set of eligible correspondences across images. In some situations, the camera cannot be placed at a position (or location) far enough from subject 100 to identify common features from a previous position.

Figure 3:
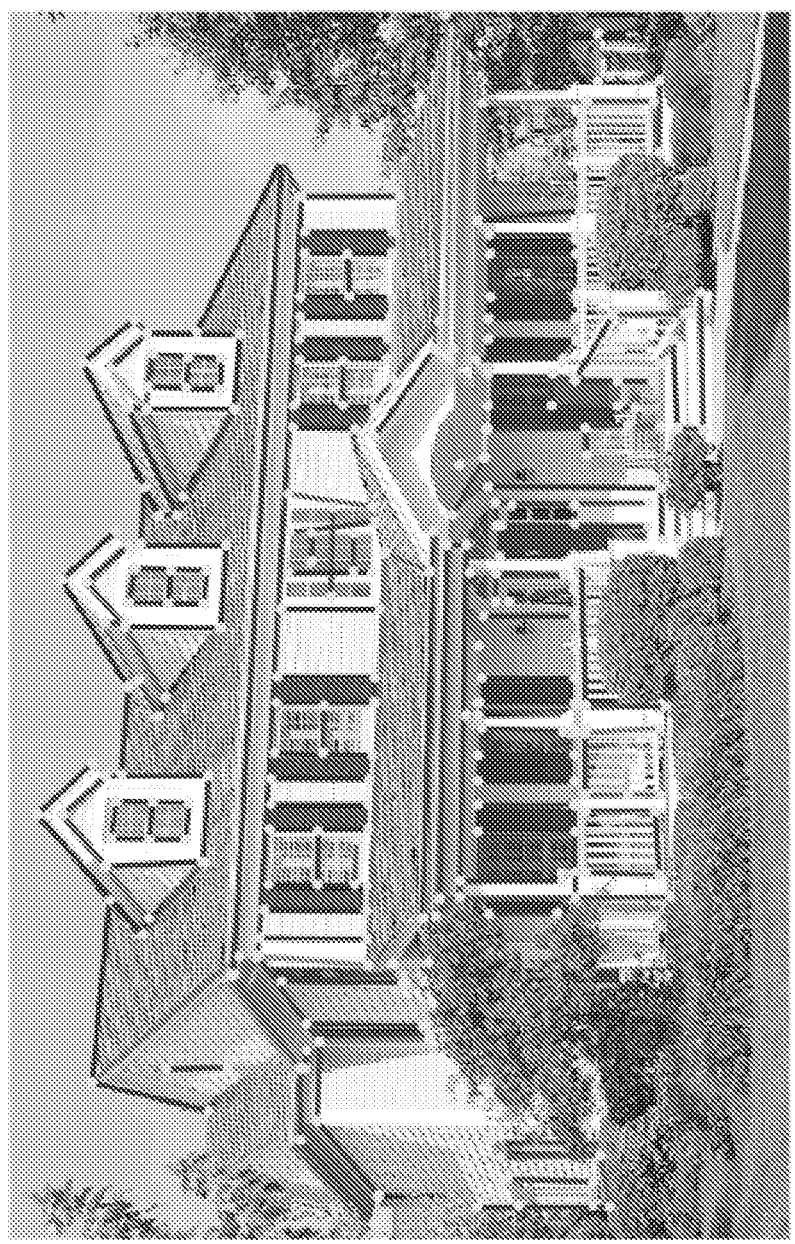
FIG. 3 illustrates a well-framed subject in a camera display, according to some embodiments.
Figure 4:
FIG. 4 illustrates tight lot line precluding direct camera capture, according to some embodiments.

For example, FIG. 3 illustrates a well-framed image of a home. The entire home fits within the viewfinder of the camera, and many eligible features (such as roof lines, window corners, etc.) are viewable. Subsequent images around the home that can capture additional feature rich images and have correspondences with those image as in FIG. 3 will assist in determining camera extrinsics and how to digitally reconstruct the home of FIG. 3. Not all subjects, however, are capable of feature-rich well-framed images. FIG. 4 depicts a house with "narrow" lot lines: the property boundary (the fence on the left side of the image) is only a few feet from the house's wall and a camera is precluded from a direct image (camera optical axis orthogonal to the wall's orientation) that can capture the entire surface (i.e., the wall). A camera can only take an oblique image of this wall to capture the windows and siding lines eligible for feature correspondence with other images.

Figure 5:
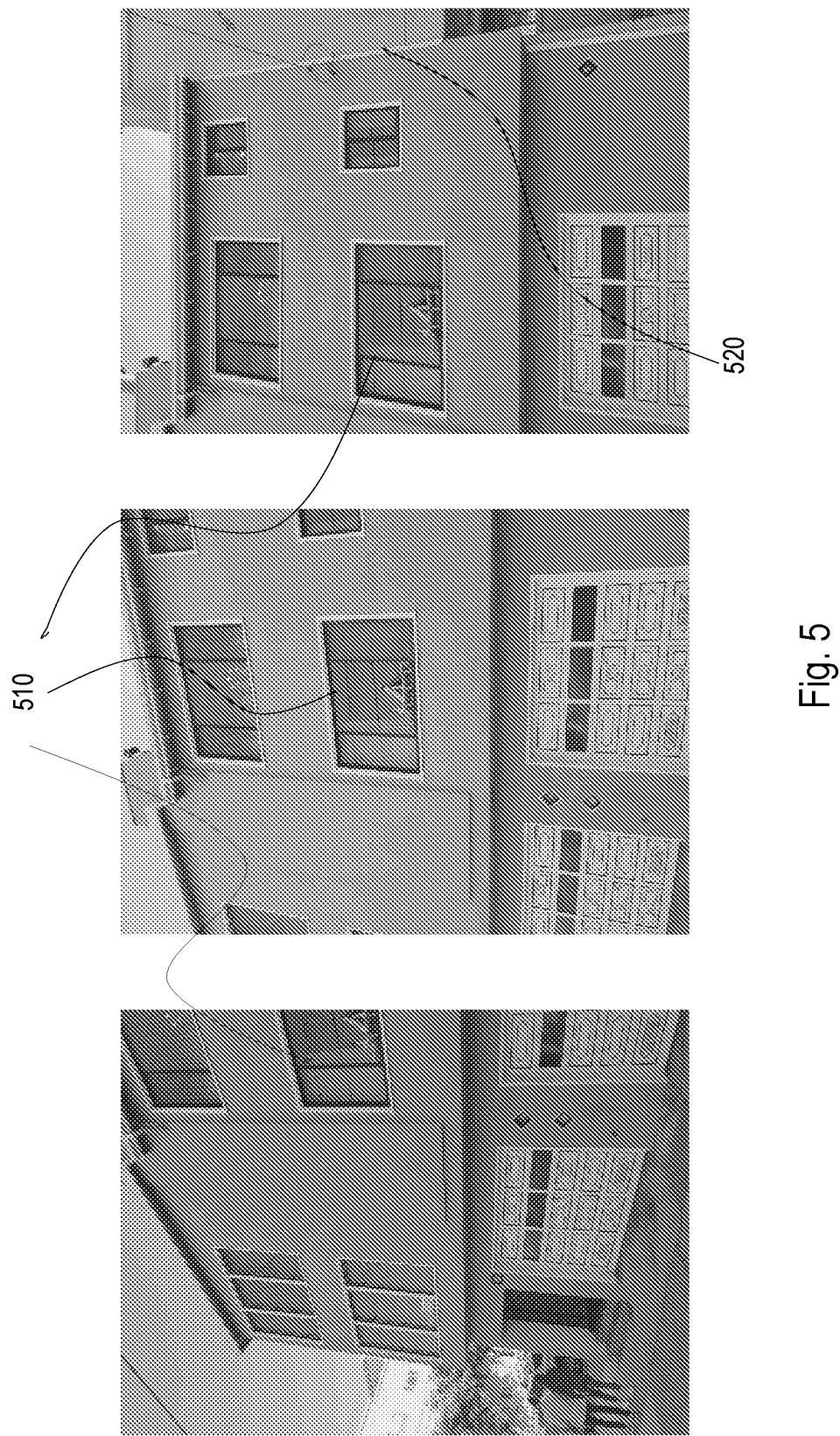
FIG. 5 illustrates a plurality of image inputs for potential panoramic image stitching, according to some embodiments.

In doing so, very little information about the adjoining wall is captured and feature correspondence with other images is limited. This is similar to the camera position as in FIG. 5, where a wide façade with two-garage doors faces a narrow street: the camera can only back up so far due to the limited street width to place the entire subject within the camera's view finder. Though each subimage in FIG. 5 depicts many features of the façade, each will have to be separately processed and correlated to the others; notably, no one subimage in FIG. 5 comprises both corners of the façade, making correspondence with any other façade of the house to features of the shown façade a multi-step process. One of skill in the art will appreciate that additional steps and images in feature correspondence and SLAM introduces error. For example, each of the subimages in FIG. 5 depict window 510, but without a full view of the façade, it is difficult for computer vision techniques to know whether window 510 is the same window in each image or whether each image depicts its own window 510 (such that the full façade would have three windows 510). Additional problems, such as ratio relationships of dimensions, persist in 3D reconstruction with input images of façades that do not have contextual information of other façades. For example, scaling ratios are less subjective and matching features across images is quicker and more accurate with images that comprise multiple corner views (when reconstructing a house).

These limitations contrast with aerial imagery that have a sufficient and controllable camera distance to the subject, and an optical axis vector that will always have a common direction relative to its subject: towards the ground (rather than parallel to). Because of this camera position and optical axis consistency in aerial imagery (e.g., top down plan views or oblique imagery) whether from a satellite platform, high altitude aircraft, or low altitude drone, the wide baseline transitions (e.g., rotation, translation, or both) and constraining lot line problems of ground level images is obviated. Aerial images enjoy common correspondences across images, as the subject consistently displays a common surface to the camera at a consistent distance (minimizing parallax discussed further below). In the case of buildings, this common surface is the roof.

Figure 6:
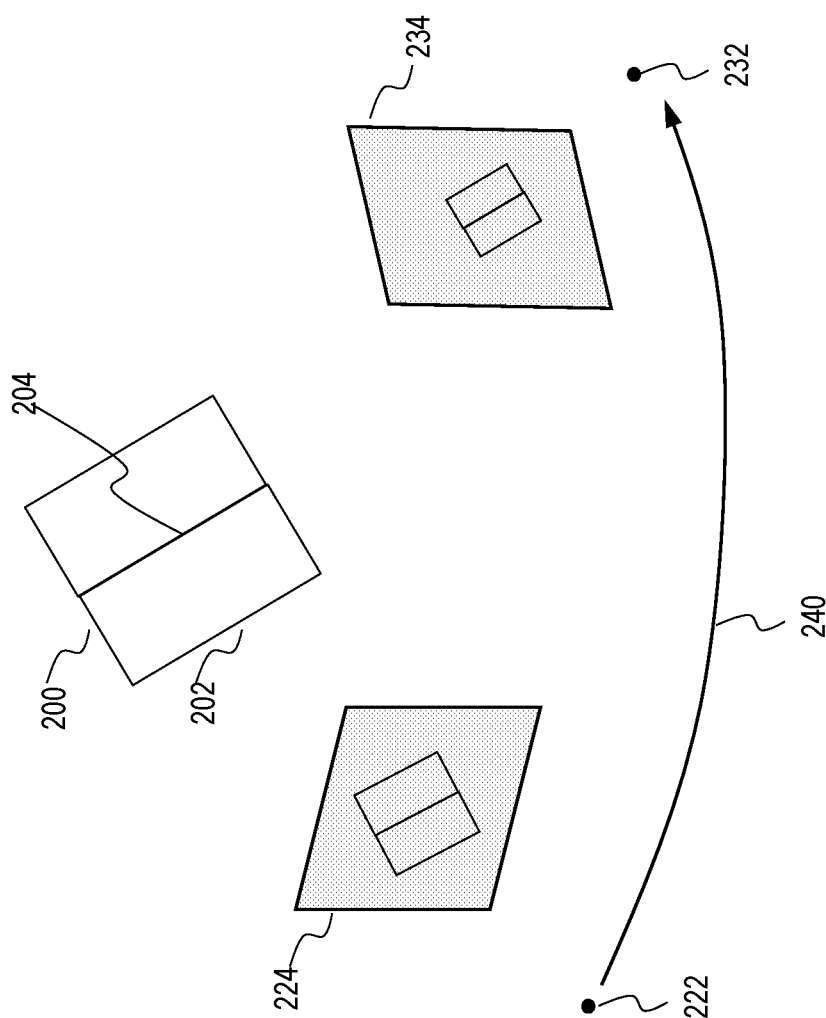
FIG. 6 illustrates freedom of movement in aerial imagery platforms.

FIG. 6 illustrates this for subject roof 200 having features roofline 202 and ridgeline 204. FIG. 6 is a top plan view, meaning the imager (e.g., camera) is directly above subject roof 200 but one of skill in the art will appreciate that the principles illustrated by FIG. 6 apply to oblique images as well, wherein the imager is still above subject roof 200 but the optical axis is not directly vertical as in a top plan view. Because the view of aerial imagery is from above, the viewable portion of subject roof 200 appears only as an outline of the roof with ridgeline 204, as opposed to the richer data of subject 100 obtained by ground-level images. As aerial camera position changes from position 222 to 232 by transition (e.g., rotation, translation, or both) 240, the view of subject roof 200 through either viewing pane 224 or 234 produces observation of the same features for correspondences, and the altitude options available to aerial platforms eliminates any tight lot line or other framing restriction altogether.

Figure 7:
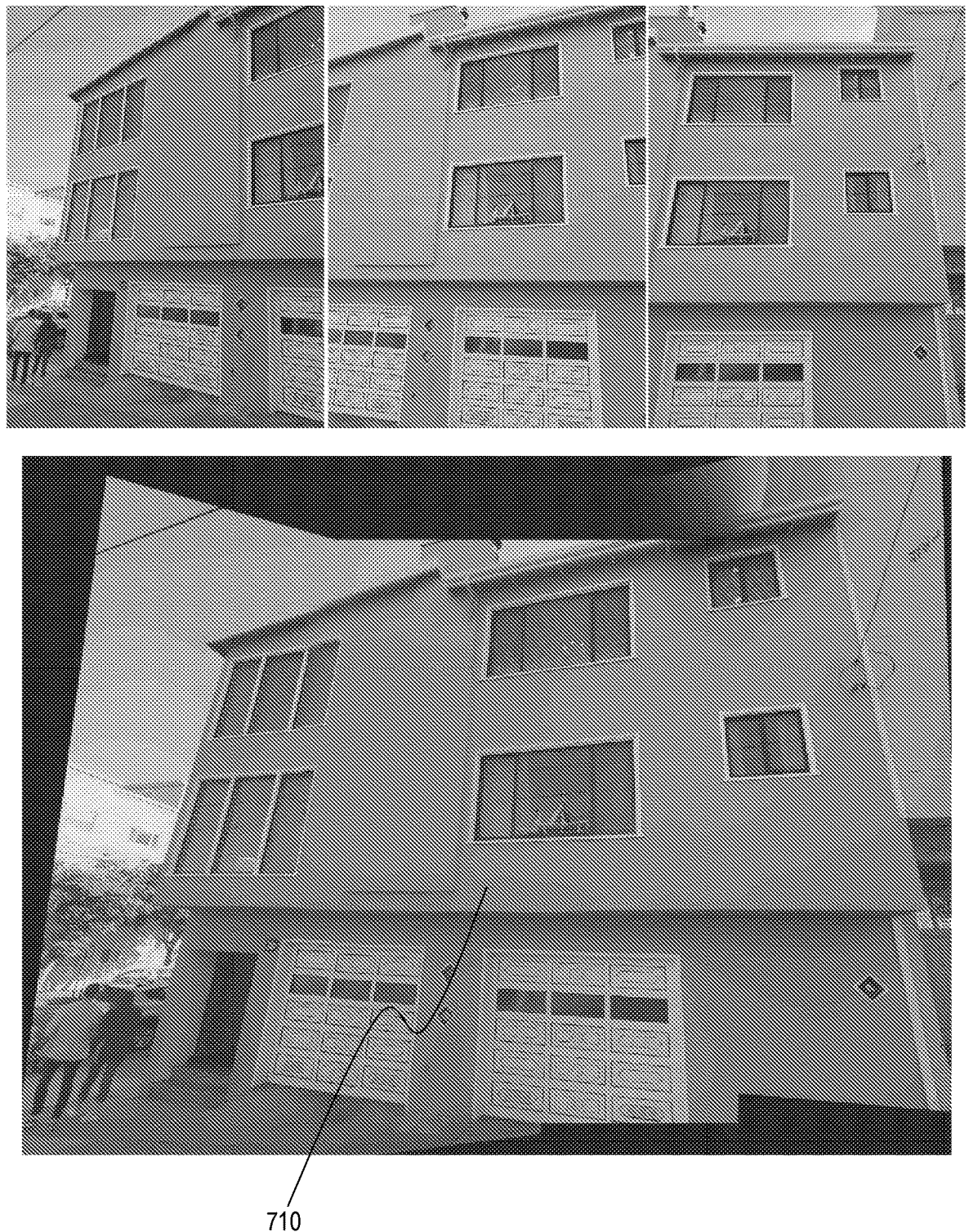
FIG. 7 illustrates successful panoramic image stitching, according to some embodiments.

It is critical then for 2D image inputs from ground-level images to maximize the amount of data related to a subject, at least to facilitate correspondence generation for 3D reconstruction. Proper image capture of the subject to capture as many features as possible per image will maximize the opportunity that at least one feature in an image will have a correspondence in another image and allow that feature to be used for reconstructing the subject in 3D space. Similarly, panoramic stitching can more fully depict features and their geometric properties of a subject, as compared to isolated constituent subimages of a panoramic image. FIG. 7 illustrates such a panoramic image, where the constituent subimages of FIG. 5 have been stitched to create panoramic image 710 that displays all features for the façade in a single image as opposed to being spread out among the subimages.

Figure 8:
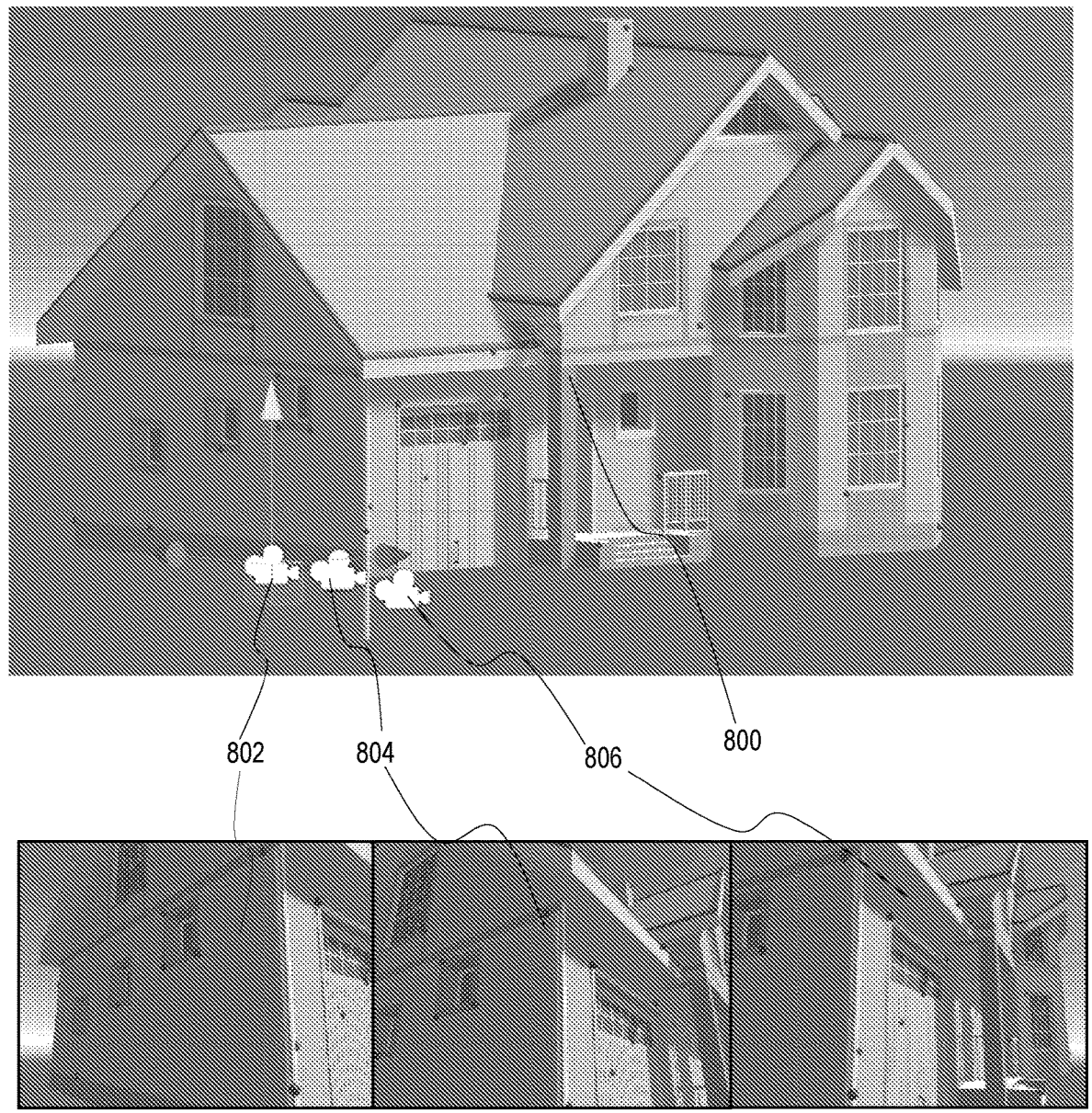
FIG. 8 illustrates successful panoramic image stitching, according to detected features within images according to some embodiments.

Panoramic image capture techniques subject the camera to pose changes for the successive image frames. These pose changes can be rotation, translation, or both. FIG. 8 illustrates a home 800 with three camera positions 802, 804, and 806 with their respective images of home 800 from that camera position. As can be seen, the rotation and translation changes across camera poses 802, 804, and 806 generate different image captures of home 800, though they possess common data in successive images such that they may be stitched together to form a panoramic image displaying data beyond the camera's default field of view limits.

Figure 1B:
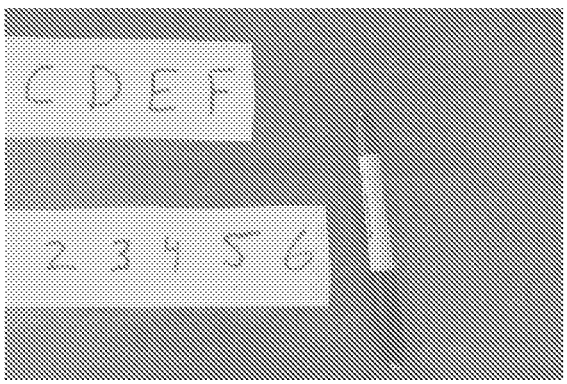
Figure 1C:
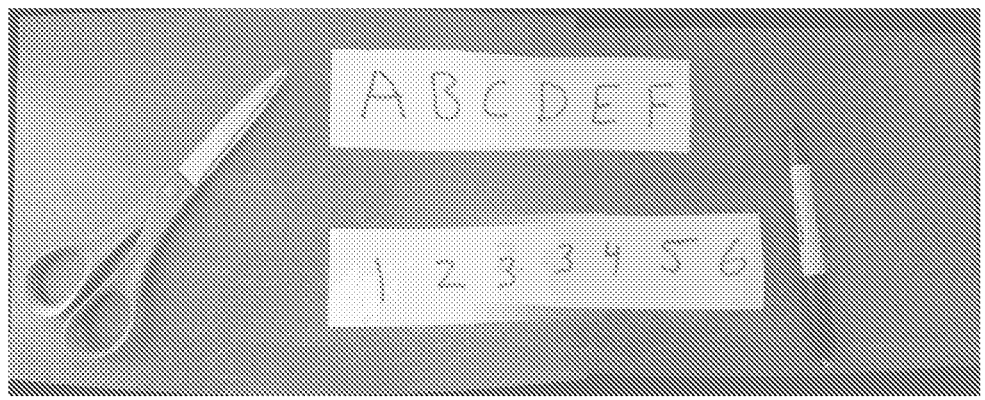
Figure 1D:
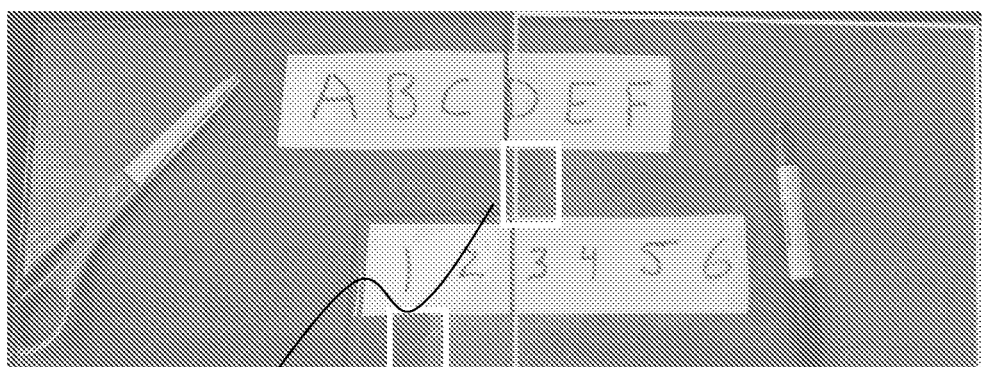
Figure 9:
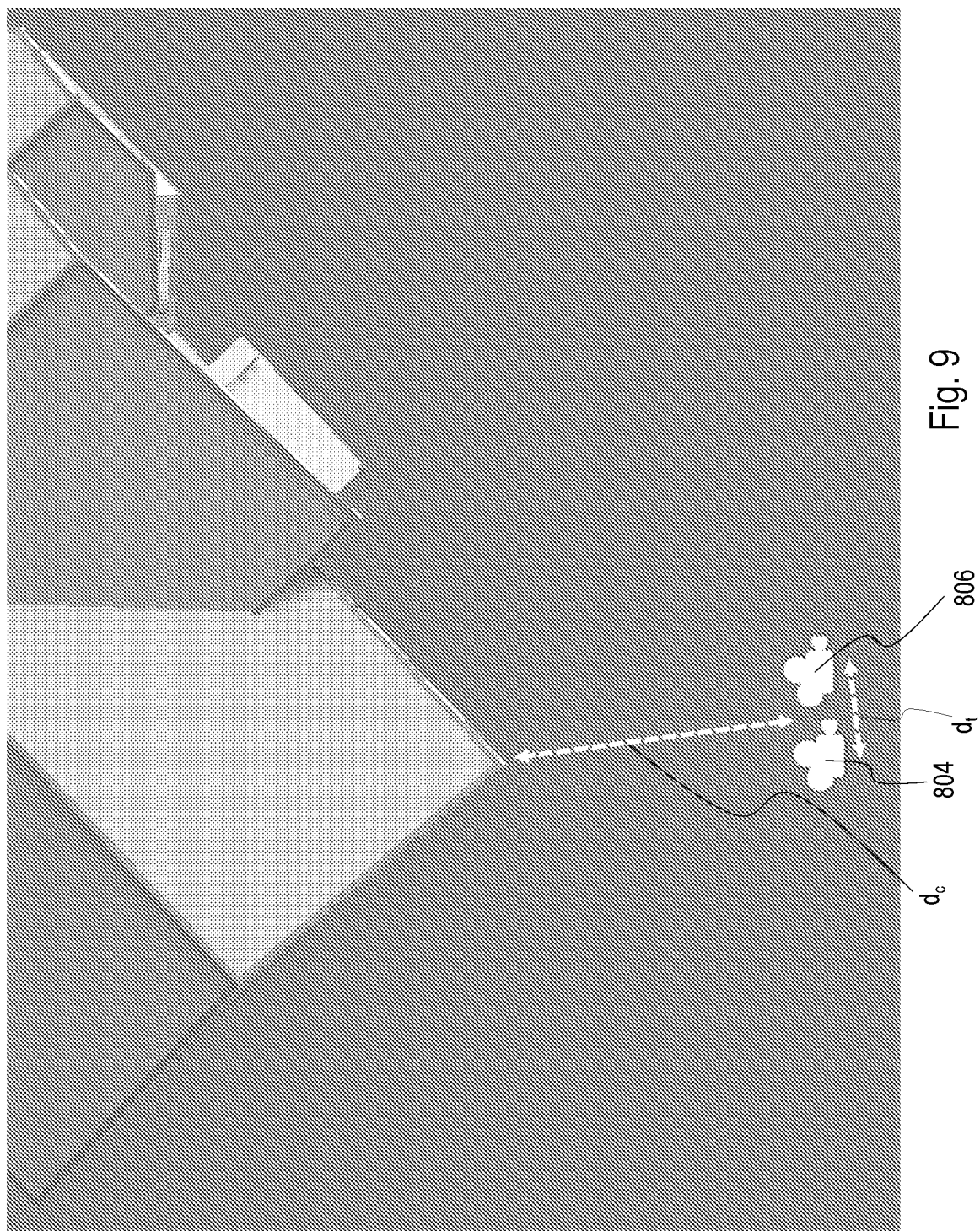
FIG. 9 illustrates the relationship of distance between cameras in panoramic pairing and the distance of the subject being captured to those cameras, according to some embodiments.

The changes in camera positions, however, introduce translation changes between the cameras. FIG. 9 shows a top plan view of home 800, with a translation change $d_t$ between camera poses 804 and 806. Parallax errors in panoramic stitching increase as the distance from camera positions to subject content decreases. In other words, a relationship exists between $d_c$ (the distance between the cameras and the content being captured) and $d_t$ (the distance between the cameras), wherein as $d_c$ decreases, $d_t$ must similarly decrease to minimize parallax error in any warping of one image frame to align with the other. Parallax errors may manifest as curved representations of lines in a panoramic image that are straight in a ground truth image, or the spatial shifts or ghosting as in FIGS. 1B and 1C.

Certain subject content exacerbates the parallax problem. FIG. 10 again illustrates a top plan view of home 800 with cameras in camera pose 804 and 806 with their respective frustum or field of view projected. As can be seen, the optical axes of the camera intersect home 800 at different distances, due to home 800 variable geometry relative to the particular camera poses. FIG. 10 suggests that, even though an image frame associated with distance to content $d_1$ may not be otherwise susceptible to parallax errors for a translation distance $d_1$ between cameras, because distance to content varies from $d_1$ to $d_c$ to $d_2$, a panoramic image stitched from these images must minimize the effects of $d_t$ due to those changes in distance to content.

Figure 11A:
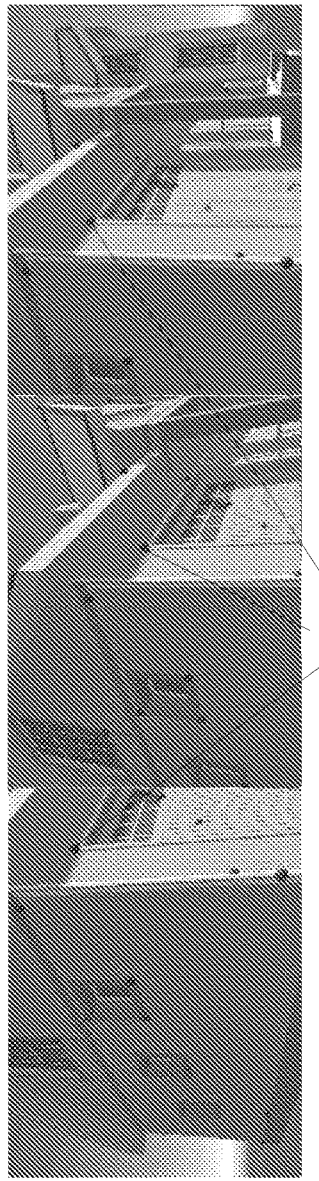
FIGS. 11A-B illustrate panoramic stitching across a plurality of images with no translation changes, according to some embodiments.

FIG. 11A depicts captured images of home 800 from various camera positions proximate to the corner of home 800. As illustrated, despite rotation among the cameras for each image there is zero translation distance between each camera.

A series of features, such as feature 1102, are extracted and displayed on a captured image according to scale invariant feature transform (SIFT), though other feature detection means such as SuperPoint, FAST keypoint detection, SURF, binary robust independent elementary features (BRIEF), or ORB may also be utilized. In some embodiments, these detected features are aligned to their corresponding features across images by warping each captured image to a respective other image to create a stitched panoramic image of the input captured images as in FIG. 11B. A specific warp or transform is responsive to the type of feature extraction technique used, which may generate different descriptors or features and lead to different matching of features based on those descriptors.

Figure 11B:
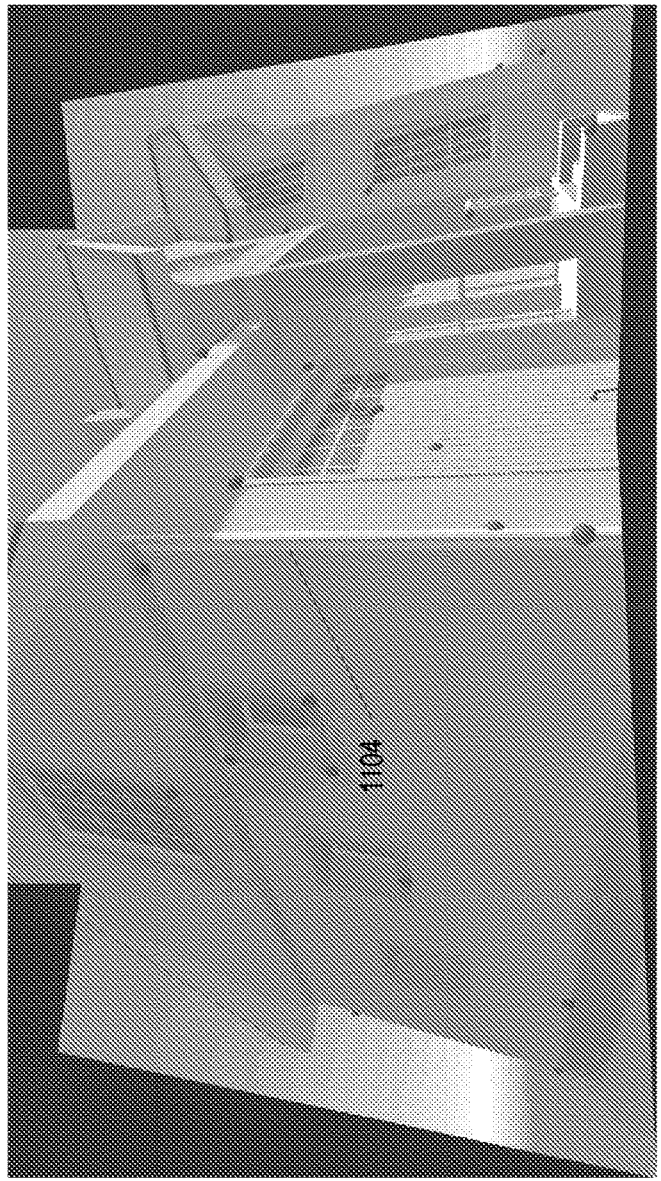

In FIG. 11B the closest point of the captured subject (home 800) is corner 1104, a distance of three meters from the cameras' positions. With no translation distance $d_t$ between cameras, the result is a clean representation of the data of each image as a single stitched panoramic image.

Figure 12A:
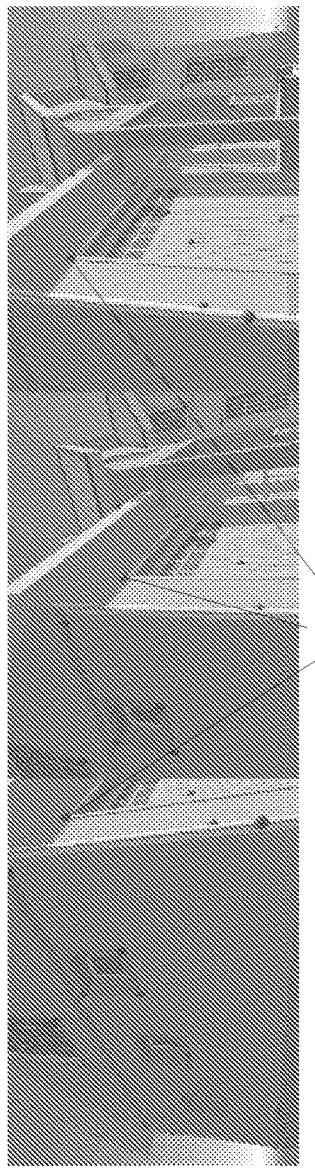
FIGS. 12A-B illustrate panoramic stitching across a plurality of images with translation changes inducing ineffective stitching, according to some embodiments.
Figure 12B:
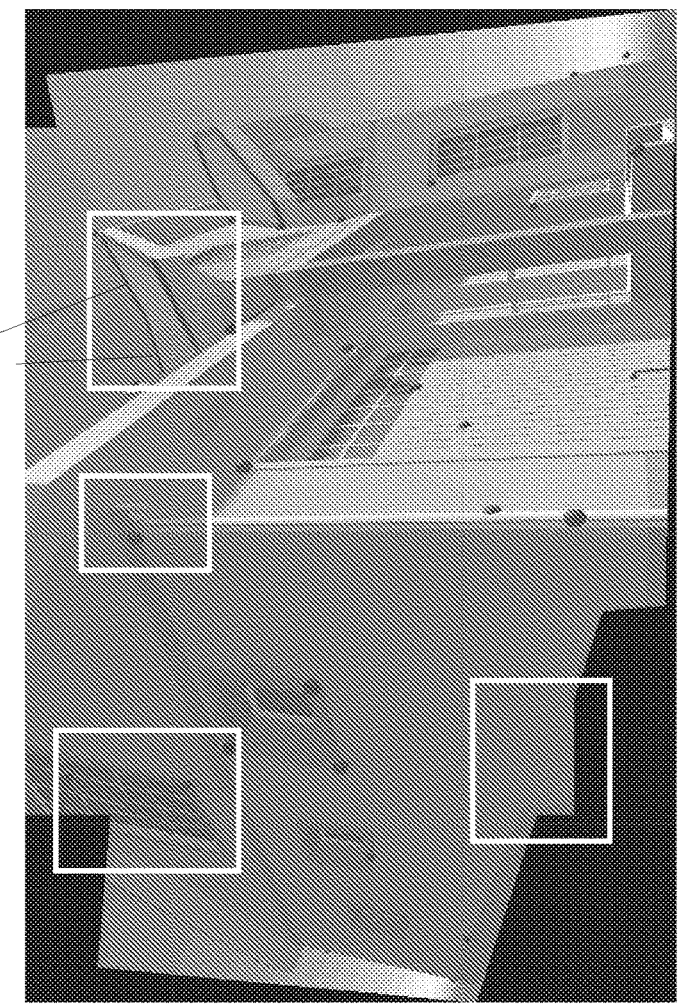

FIG. 12A depicts a similar series of captured images of home 800 from various camera positions proximate to the corner of home 800. As illustrated, in addition to the rotation among the cameras for each image there is a half meter of total translation between all camera positions (approximately 25 cm of translation between each image). Detected features from each captured image inform warping, as in FIG. 11A, of the images to one another to form a panoramic image. FIG. 12B illustrates the resultant stitched panoramic image. Here, significant parallax errors result from the impact of the translation distance $d_t$. The outlined gable of the top right most outlined box displays as non-straight line segments and the window geometry of the left top outlined box is broken. FIG. 12B does not represent the geometric relationships of the ground truth images and is not suitable for input in 3D reconstruction as any correspondences with features as in FIG. 12B do not represent accurate location or orientation of those features in real life (e.g., in the captured images of FIG. 12A).

TABLE 1

Table 1 represents experimental results for parallax error relationships according to some embodiments. FIGS. 11A and 11B correlate to images of Set ID 1, and FIGS. 12A and 12B correlate to images of Set ID 4.

| Set ID | Distance to house $d_c$ (meters) | Distance between cameras $d_t$ (meters) | Dioptric relationship $d_t/d_c$ | Parallax error |
|---|---|---|---|---|
| 1 | 3 | 0 | 0 | No |
| 2 | 3 | 0.3 | 0.1 | Yes |
| 3 | 4 | 0.3 | 0.075 | Yes |
| 4 | 3 | 0.5 | 0.17 | Yes |
| 5 | 3 | 0.15 | 0.05 | No |
| 6 | 6 | 0.3 | 0.05 | No |
| 7 | 4 | 0.15 | 0.0375 | No |
| 8 | 3 | 0.1 | 0.033 | No |

As seen in Table 1, experimental evidence indicates that parallax error that produces an unsuitable panoramic image, for example by introducing the image artifacts of FIG. 12B, occurs at dioptric relationships to translation above 0.05. Diopters are inverse distance relationships in optical physics, wherein the reciprocal distance of an object to an image is indicative of visual properties. When translation distance between cameras is associated with the subject content's diopter to those cameras, acceptable panoramic stitching parameters may be identified.

In addition to parallax errors, panoramic image stitching is further subject to registration plane errors. When features across images are identified, the warping of the images (or discrete portions of images) to align the correlating features is done to a registration plane. Registration plane selection may in turn generate vastly different panoramic outputs. Registration plane selection may be based on a homography of a particular surface across all images, that is, a transformation applied to each image aligns features of the selected surface to one another. The surface with a homography that generates the lowest error (such as by Euclidean distance) of overlapping features outside the selected surface may be selected as the registration plane. In some embodiments, a particular image or plane within all images, is used as the registration plane.

Figure 13:
FIG. 13 illustrates a plurality of image inputs for panoramic image stitching, according to some embodiments.
Figure 14A:
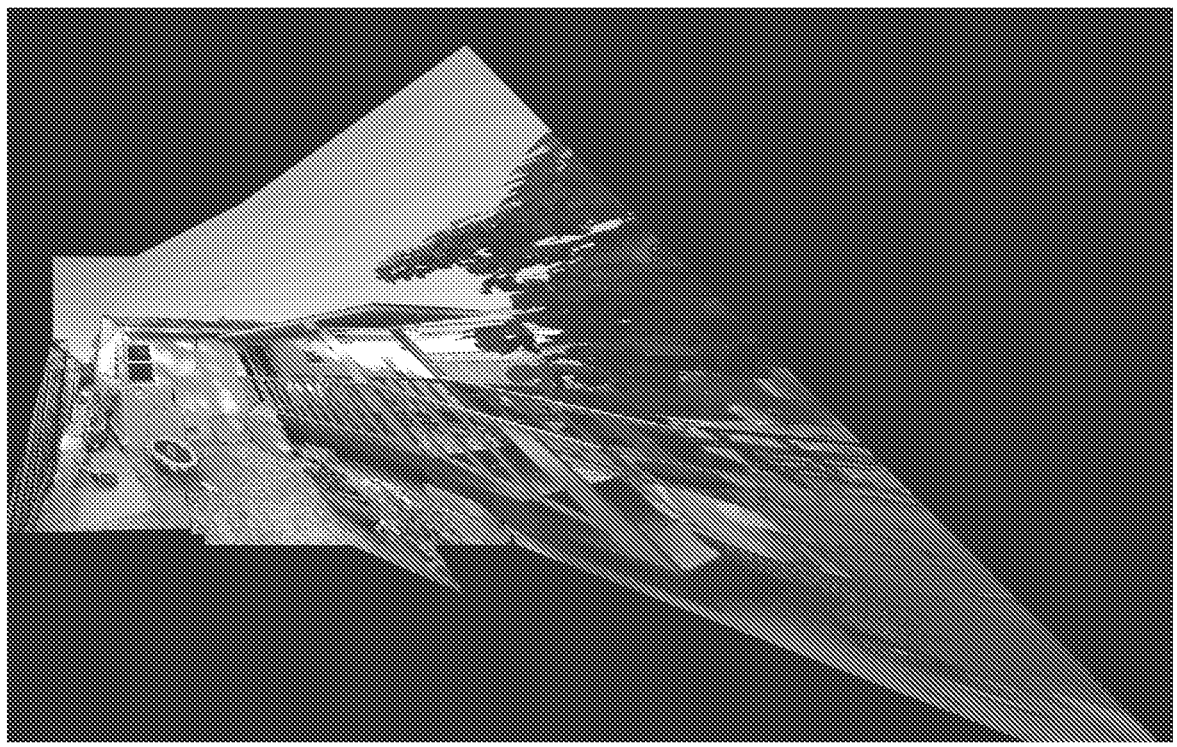
FIGS. 14A-B illustrate registration plane selection image stitching effects, according to some embodiments.
Figure 14B:

Referring to FIG. 13, a series of image inputs of the home with tight lot lines as in FIG. 4 are captured. While pairing of photos in FIG. 13 can maintain a $d_t/d_c$ relationship below a parallax error threshold to produce a panoramic image with little to no parallax error, which image of the set the others are warped to produces varying panoramic outputs. For example, choosing an image from the top row of FIG. 13 as the registration plane, each representing the left most portion of the home in the image, will induce significant warping of the images in the lower row of FIG. 13 that represent the right most portion of the home in the image. FIG. 14A illustrates this extreme warping. By contrast, in some embodiments, using an image from the middle row of FIG. 13 as the registration plane, each representing a median portion of the home in the image, induces less warping of the images for the flanking portions, as shown in FIG. 14B. Extreme warping, as in FIG. 14A, may also lead to cropping complications, as geometrical information of the home is not evenly distributed through standard image aspect ratios and may transmit as a higher file size as compared to a cropped image as in the white bounding box portions of FIG. 14B which may remove superfluous scene information that is not related to the home.

In some embodiments, an input image with a median translation distance to the flanking, or lateral limit, images of an eligible panoramic image set is selected as a registration image, and the remaining images in the eligible panoramic image set are warped to the median registration image according to the alignment of detected feature sets.

In some embodiments, an eligible panoramic image set is created by collecting (or accessing/receiving) a plurality of images and deleting (or disregarding) those that do not maintain the desired $d_t/d_c$ relationship for the subject content, and building the panoramic image with only the remaining (eligible) images. In some embodiments, $d_t$ is collected from the camera itself, such as by inertial measurement units (IMUs), gyroscopes, or augmented reality computer outputs. Augmented reality computer outputs comprising $d_t$ may be generated by visual inertial odometry output, or anchor detection across image frames. For those images that produce a $d_t$ in excess of a permissible $d_t/d_c$ relationship, the image is discarded (or disregarded) from consideration of use in a panoramic image stitching. In some embodiments, the permissible $d_t/d_c$ relationship limit is 0.05; in some embodiments the $d_t/d_c$ relationship limit is 0.1.

Figure 15A:
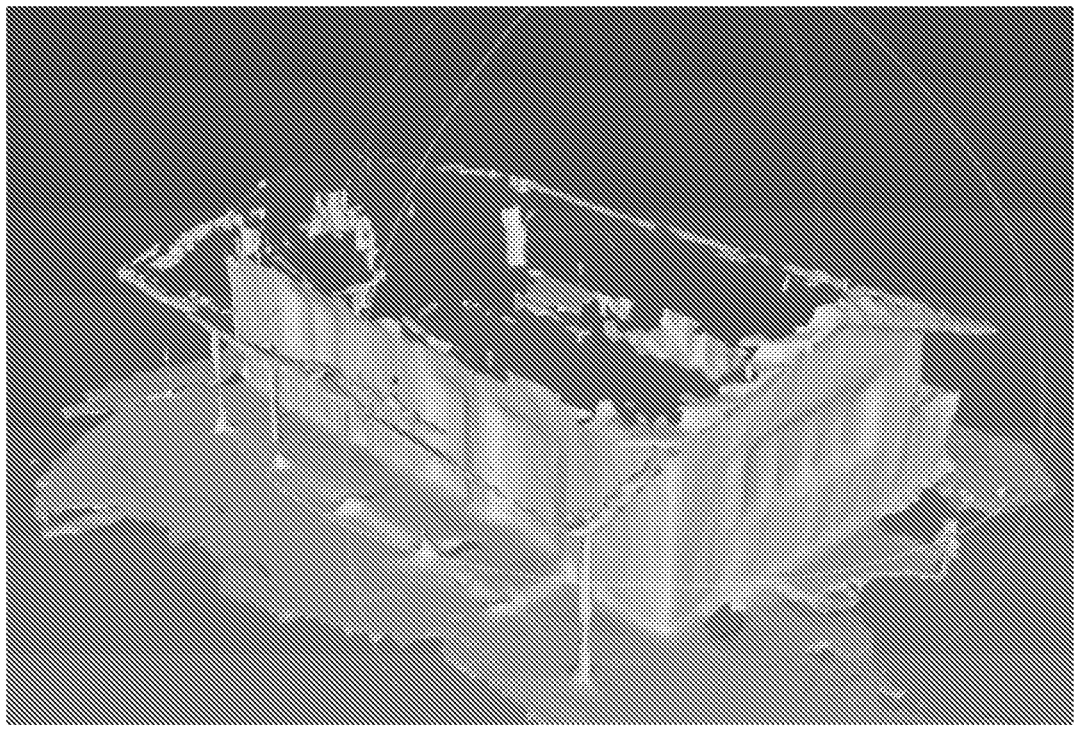
FIGS. 15A-B illustrate dense point cloud collection from depth sensors, according to some embodiments.
Figure 15B:

In some embodiments, $d_c$ is by coupling the camera to a depth sensor, such as LiDAR or time of flight sensor embedded within a data capture device (such as a smartphone or tablet computer) that is simultaneously capturing images for the panoramic image. Pixel depth data for detected features may be collected, and the nearest pixel value related to the subject content from any one image of the image set is selected as $d_c$ for the panoramic image. For example, FIGS. 15A and 15B illustrate sample depth sensor data collection of a home, using a tablet enabled LiDAR sensor. The dense cloud created from the scans of FIGS. 15A and 15B comprises holes and noise within the data, and does not produce sharp lines for features. These artifacts may limit suitability for direct reconstruction. Such data does, however, produce depth information for the imager to the subject content, and can provide a $d_c$ value (or, in some embodiments, a nearest $d_c$ value) for a plurality of images used in panoramic stitching.

In some embodiments, determining $d_c$ is by collecting a depth map from a multicamera platform. In addition to exterior subjects (such as images of the outside of homes), interior panoramics are likely to make greater utility of multicamera rigs for panoramic stitching of interior geometries closer to the multicamera rig than an exterior subject may be. The nearest depth pixel for a pixel associated with the subject content is selected as $d_c$ for the image set.

In some embodiments, determining $d_c$ is from an augmented reality camera that produces a point cloud from captured image frames, or reprojects points into a displayed image frame.

Figure 16:
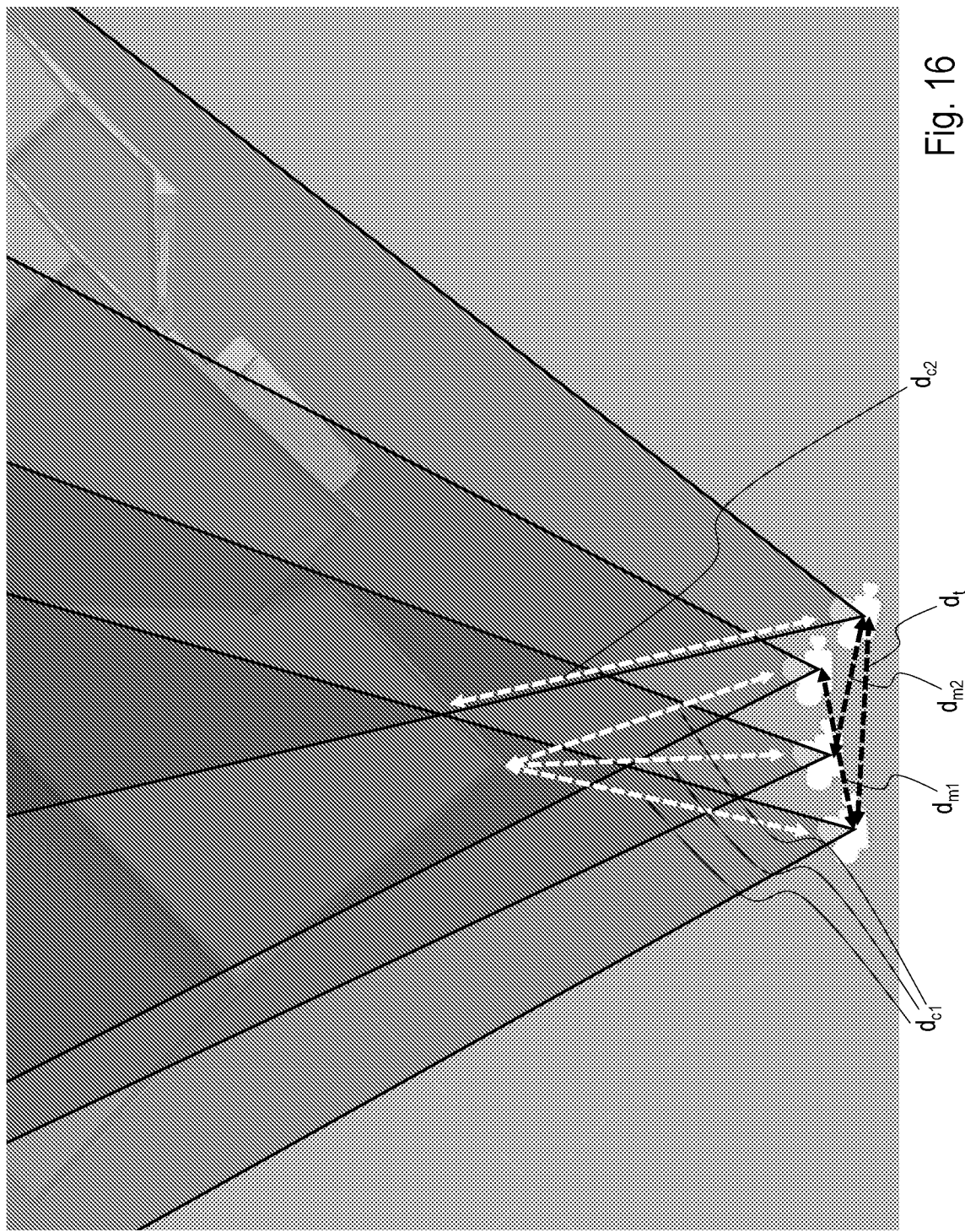
FIG. 16 illustrates candidate distances involved in selection of panoramic images for stitching, according to some embodiments.

FIG. 16 illustrates several embodiments for panoramic image processing. As illustrated, four camera positions with associated overlapping fields of view to the subject home generate data for possible panoramic image stitching. In some embodiments, even though $d_{c2}$ is the nearest image point for the far right camera, $d_{c1}$ is the nearest point for the other three cameras, and is used as the $d_c$ distance for determining acceptable $d_t$ translation limits for all cameras. Values for $d_{c1}$ and $d_{c2}$ may be derived from depth sensor information, augmented reality reports, or multicamera rig outputs as discussed above.

As applied, and assuming (i) a three meter $d_{c1}$ in FIG. 16 and (ii) a desired $d_t/d_c$ relationship less than 0.05, if the far right camera were greater than 15 centimeters from the far left camera, the parallax error tolerance would be exceeded. In some embodiments, the image data associated with the far right camera is removed (or disregarded) and only image data for the three left cameras are utilized to stitch a panoramic. In some embodiments, the image data associated with the far left camera is removed (or disregarded) and only image data for the three right cameras are utilized to stitch a panoramic. In some embodiments, multiple panoramic images are stitched and used for reconstruction inputs, each panoramic comprising image data within the acceptable parallax error relationship limits.

In some embodiments, instructive prompts are displayed on the camera indicating permissible translation motion for subsequent camera positions to maintain the necessary dioptric relationship. For example, a status indicator shows a binary prompt for when the camera is within permissible threshold translation distance relative to other camera poses of the capture session, and when a camera is outside permissible threshold translation distance. Such a prompt could be a green light display concurrent with camera positions within the translation tolerance (i.e., the threshold translation distance), and red light display concurrent with camera positions outside the tolerance (i.e., the threshold translation distance); such a prompt could be textual instructions to stop or slow movement between camera positions. In some embodiments, a spatial indicator is displayed. A spatial indicator could be a visual overlaid on the display guiding a user to align the subsequent image with; the placement of the visual overlay being such that movement of the camera to that visual cue maintains the necessary dioptric relationship. A spatial indicator could be a representation of the camera with spatial limit indicators showing where the camera is in relation to permissible dioptric relationship limits based on received images or images to be captured.

In some embodiments, a registration image is selected from a plurality of input images by identifying which cameras have the least translation movement $d_m$ to a lateral limit camera. For example, identifying a median camera for registration image selection as between a pair of middle camera (as in FIG. 16) may be performed by determining the distance of a candidate median camera to the furthest camera in the set. The candidate median camera with the smallest median translation movement $d_m$ is selected as the camera for the associated registration image.

Referring to FIG. 16, $d_{m1}$ represents the far left camera's translation distance to the right camera of the middle pair, and $d_{m2}$ represents the far right camera's translation distance to the left camera of the middle pair. In some embodiments, when $d_{m2} < d_{m1}$, the left camera of the middle pair is selected as the registration image that all other images are warped to. In some embodiments, when $d_{m2} > d_{m1}$, the right camera of the middle pair is selected as the registration image that all other images are warped to.

In some embodiments, the distance between the lateral limit camera's $d_t$ is halved, and the camera with the translation position closest to the $d_t$ half value is selected at the registration image.

TABLE 2

| | Camera 1 | Camera 2 | Camera 3 | Camera 4 |
|---|---|---|---|---|
| Distance relative to camera 1 | 0 m | 0.07 m | 0.14 m | 0.18 m |

Table 2 illustrates distances of the camera in FIG. 16, with camera 1 being the left most camera and each successive camera moving to the right. Total translation distance $d_t$ between the lateral limit cameras (cameras 1 and 4) is 18 cm. In some embodiments, this distance is halved, and the resultant 9 cm median translation distance is used to determine which camera to use as median position for registration image selection. According to Table 2, the median translation distance is closest to Camera 2, and image frame associated with this camera is selected for the registration plane.

Not every image of a plurality of images for panoramic stitching will capture the same feature. Referring back to FIG. 5, post 520 in the right most subimage of FIG. 5 is the closest feature of the subject content house to the camera among the subimages of FIG. 5, but it not visible in the left most subimage. If the left most subimage was the first subimage collected in a series of subimages for panoramic stitching, a $d_c$ based on the first subimage may suggest a $d_t/d_c$ relationship unsuitable for subsequent images. Feedback instructions during panoramic capture may in turn give improper prompts to a user for capturing a panoramic image with associated translation limitations. Determining a $d_c$ for a plurality of images is, therefore, in some embodiments a dynamic determination with progressive updates for subsequent images.

Figure 17:
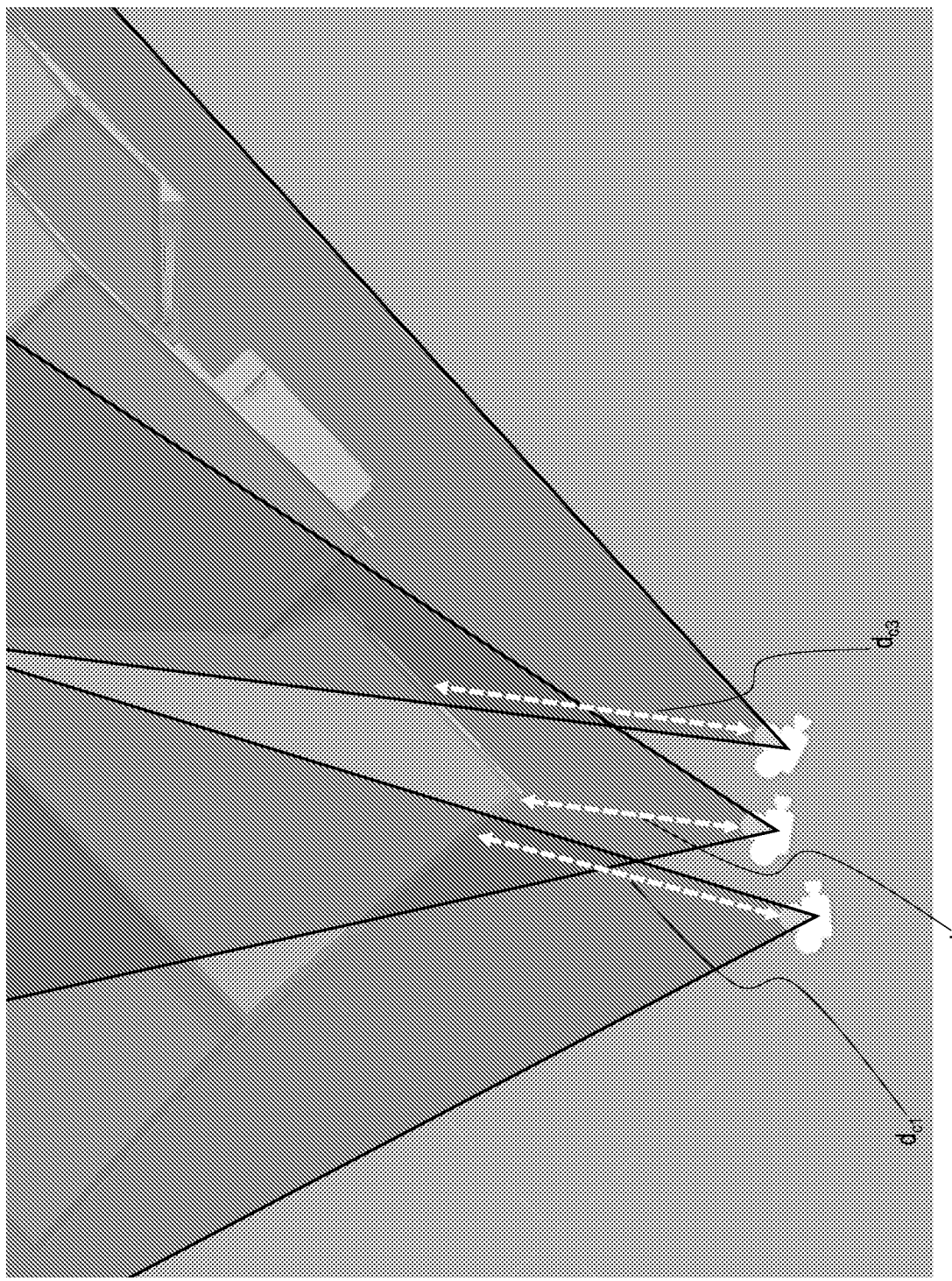
FIG. 17 illustrates disparate content distances in panoramic stitching, according to some embodiments.

FIG. 17 illustrates three cameras with associated fields of view for constructing a panoramic image, each camera having a different distance to the content in its field of view (described as $d_{c1}$, $d_{c2}$, and $d_{c3}$). In some embodiments, to ensure a "short" $d_c$ in a subsequent image does not invalidate previously captured image(s) that suggest more permissible translation changes, the values of initial distances to content are reduced, thereby limiting the translation distance a subsequent image may otherwise be permitted to have.

For example, in FIG. 17 if the left most camera produced the first subimage for panoramic stitching, permitted translation based on $d_{c1}$ may allow a larger degree of movement than would be permitted based on $d_{c2}$. In some embodiments, the value of the initial distance $d_c$ is reduced. The reduction amount could be half, one third, one fourth. A translation distance for subsequent camera positions is applied based on the reduced content distance. In some embodiments, the translation distance is progressively updated based on the $d_c$ of each subsequently received image. In some embodiments, a subsequent image's $d_c$ updates the overall $d_c$ for the plurality of subimages. In some embodiments, the updating is an average calculation (either using the reduced value of the initial $d_c$ or the true value). For example, to determine an updated $d_c$ between $d_{c1}$ and $d_{c2}$, the following equation could apply:

Updated $d_c = (d_{c1}/n + d_{c2})/2$ wherein $n$ is the reduction value applied to the initial content distance.

The previous equation is merely illustrative and is not limiting on all mathematical means of updating content distance used for dynamic evaluation of translation movement permitted across camera positions in panoramic stitching.

It will be appreciated that in some situations, a camera position otherwise within translation tolerance as determined by previous images has content within its field of view with a $d_c$ that breaks the tolerance for the image set. In other words, camera translations from earlier camera positions no longer fit the dioptric relationship for the set based on a newest $d_c$ received, and the update to $d_c$ it produces. In some embodiments, instructive prompts direct recapture of those portions that no longer satisfy the updated dioptric relationship. In some embodiments, positional feedback is provided for positioning a camera within a translation tolerance for image recapture. In some embodiments, a plurality of panoramics are stitched from the comprehensive set; each panoramic uses only those subimages that satisfy the dioptric relationship.

In some embodiments, a first series of images are captured to determine the intended content to be captured and the distance to the content within those subimages. The nearest $d_c$ of any one camera of the first series of captured images is derived. A second series of image captures of the same subject matter comprises instructive prompts for positioning the camera within dioptric relationship limits for building a suitable panoramic image based on the derived $d_c$ from the first series of images.

In some embodiments, a camera display is initially grayed out, and as a camera captures the first series of images the display properties change to indicate feedback that data captured satisfies a dioptric relationship. For example, portions or image frames of the capture session within the $d_t/d_c$ relationship limit are modified such as revealing full color portions of the grayed out display.

In some embodiments, as the second series of images are captured, the display shows full image data for the data captured within the translation tolerances.

In some embodiments, image capture for a panoramic image is nonlinear. That is, an initial image does not dictate the guidance of a subsequent image. Referring again to FIG. 17, the middle camera with $d_{c2}$ could be the initial image, and the left or right the next image in the plurality images. Provided the camera maintains translation distance among images, any image sequence may be followed for generating or selecting a plurality of subimages for panoramic image stitching.

In some embodiments, panoramic stitching approaches may equally consider all points within image captures. That is to say that these panoramic stitching approaches may equally consider points that are close to the camera position and points that are far from the camera position. As the translation distance is more sensitive to nearer data points as described above with respect to the dioptric relationship, reconstruction using points that are close to the camera position are more prone to parallax errors and reconstruction using points that are far from the camera position are less prone to parallax errors.

Figure 18:
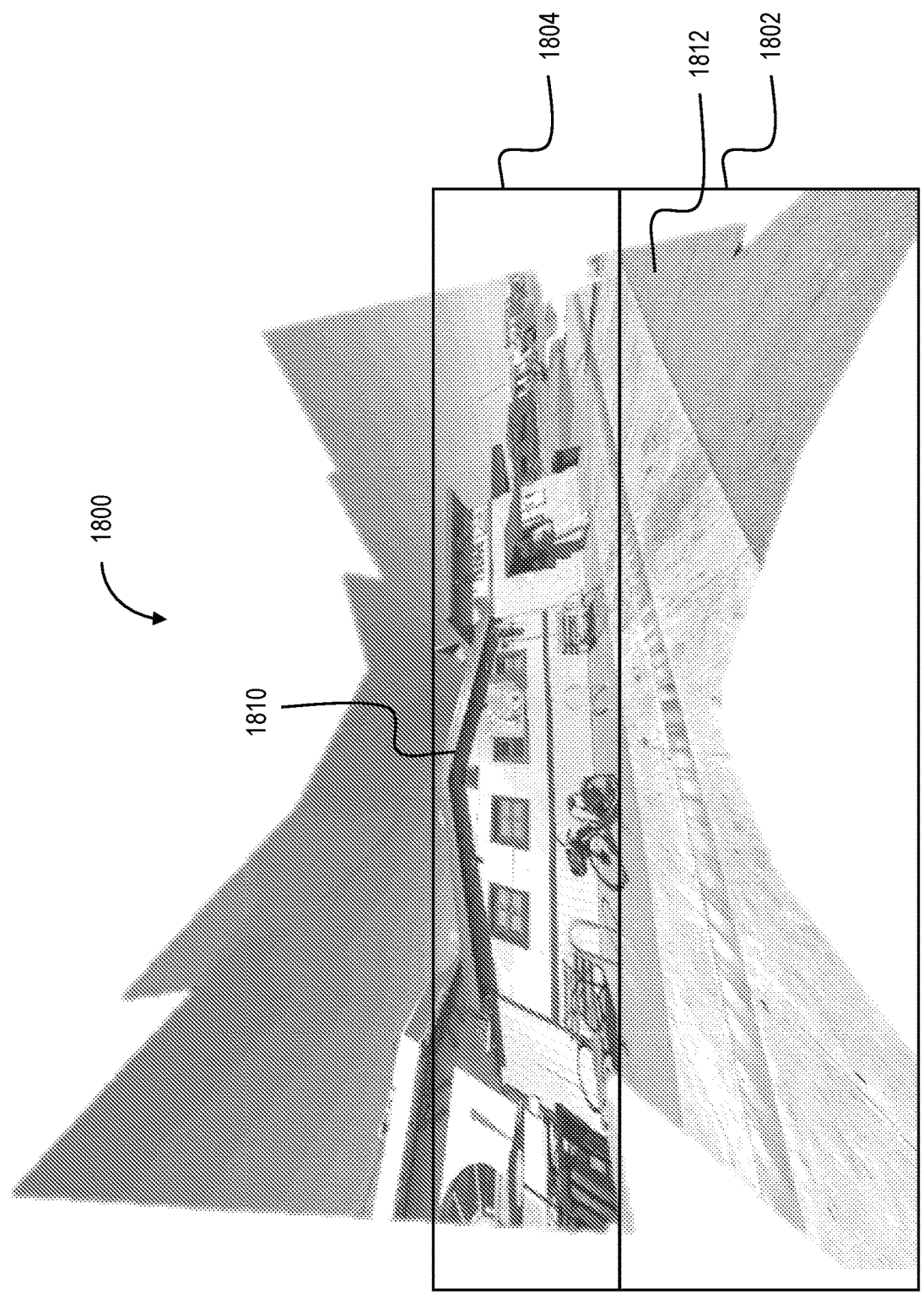
FIG. 18 illustrates a panoramic image stitched utilizing panoramic stitching approaches that equally consider all points within image captures, according to some embodiments.

FIG. 18 illustrates panoramic image 1800, according to some embodiments. Panoramic image 1800 is stitched utilizing a panoramic stitching approach that equally considers all points within the image captures. Panoramic image 1800 can be associated with a camera position.

In some embodiments, the camera position associated with panoramic image 1800 is related to camera positions of the subimages that are stitched together to create panoramic image 1800. The camera position associated with panoramic image 1800 may be any one of the camera positions of a subimage used in panoramic image 1800, or a virtual or synthetic camera position derived from two or more of the subimage camera positions. In one example, if three successive subimages are stitched together to create panoramic image 1800, the camera position of panoramic image 1800 can be the camera position of the second subimage. In another example, if four successive subimages are stitched together to create panoramic image 1800, the camera position of panoramic image 1800 can be a virtual or synthetic camera position between the camera position of the second subimage and the camera position of the third subimage, or as derived from all four camera positions of the four subimages.

In some embodiments, the camera position associated with panoramic image 1800 is related to the subimages that are stitched together to create panoramic image 1800. For example, image data of one or subimages that are stitched together to create panoramic image 1800 can be used to determine a camera position associated with panoramic image 1800. In one example, if three successive subimages are stitched together to create panoramic image 1800, image data of the second subimage can be used to determine the camera position of panoramic image 1800. In another example, if four successive subimages are stitched together to create panoramic image 1800, the second subimage and the third subimage can be used to determine the camera position of panoramic image 1800, or all four subimages can be used.

Points in region 1802 are closer to the camera position, and therefore contribute more to parallax errors as compared to points in region 1804 that are farther from the camera position. The parallax errors in panoramic image 1800 manifest as artifacts in region 1802.

In some embodiments, the subject of the image captures can be far from the camera position. For example, image captures of a building (e.g., a residential building or a commercial building) may have associated camera positions that are across the street from the building. In these embodiments, the aforementioned panoramic stitching approaches can be improved upon by considering points that are far from the camera position, and, in some embodiments, not considering, or disregarding, points that are close to the camera position. In some embodiments, if a distance between the camera position and a point is greater than or equal to a threshold distance value, the point can be considered to be far from the camera position, and the if the distance between the camera position and the point is less than the threshold distance value, the point can be considered to be close to the camera position. In one example, the threshold distance value can be the distance between the camera position and the subject of the image, such as a building. In this example, the points between the camera position and the building can be considered to be close to the camera position, and the points on and beyond the building can be considered to be far from the camera position. In this example, the threshold distance value is a relative value (i.e., relative to the building). In another example, the threshold distance value can be a predetermined distance value, such as five meters. In this example, points between the camera position and five meters from the camera position can be considered to be close to the camera position, and points that are at five meters and more than five meters from the camera position can be considered to be far from the camera position. In this example, the threshold distance value is an absolute value (i.e., absolute distance). In yet another example, the threshold distance value is related to one or more sensors such as a LiDAR sensor or a visual sensor. In this example, points that are within a LiDAR sensor operating range can be considered to be near the camera position, and points that are not within a LiDAR sensor operating range can be considered to be far from the camera position. Continuing the previous example, the improved panoramic stitching approaches can consider points that are on the building or the same distance as the building, and not consider, or disregard, points that are on the sidewalk closest to the camera position.

The improved panoramic stitching approaches may still result in artifacts such as curved representations of lines in a panoramic image that are straight in ground truth images, or spatial shifts, or ghosting. However, these artifacts may not be as prominent for points that are far from the camera position relative to points that are close to the camera position.

Figure 19:
FIG. 19 illustrates a panoramic image stitched utilizing panoramic stitching approaches that consider points that are far from a camera position, according to some embodiments.

FIG. 19 illustrates panoramic image 1900, according to some embodiments. Panoramic image 1900 is stitched utilizing panoramic stitching approaches described above that consider points far from a camera position, and, in some embodiments, do not consider, or disregard, points close to the camera position. Panoramic image 1900 can be associated with a camera position. Points in region 1902 are close to the camera position and, in some embodiments, are not considered when stitching images to generate panoramic image 1900. Points in region 1904 are far from the camera position and are considered when stitching images to generate panoramic image 1900.

Figure 20:
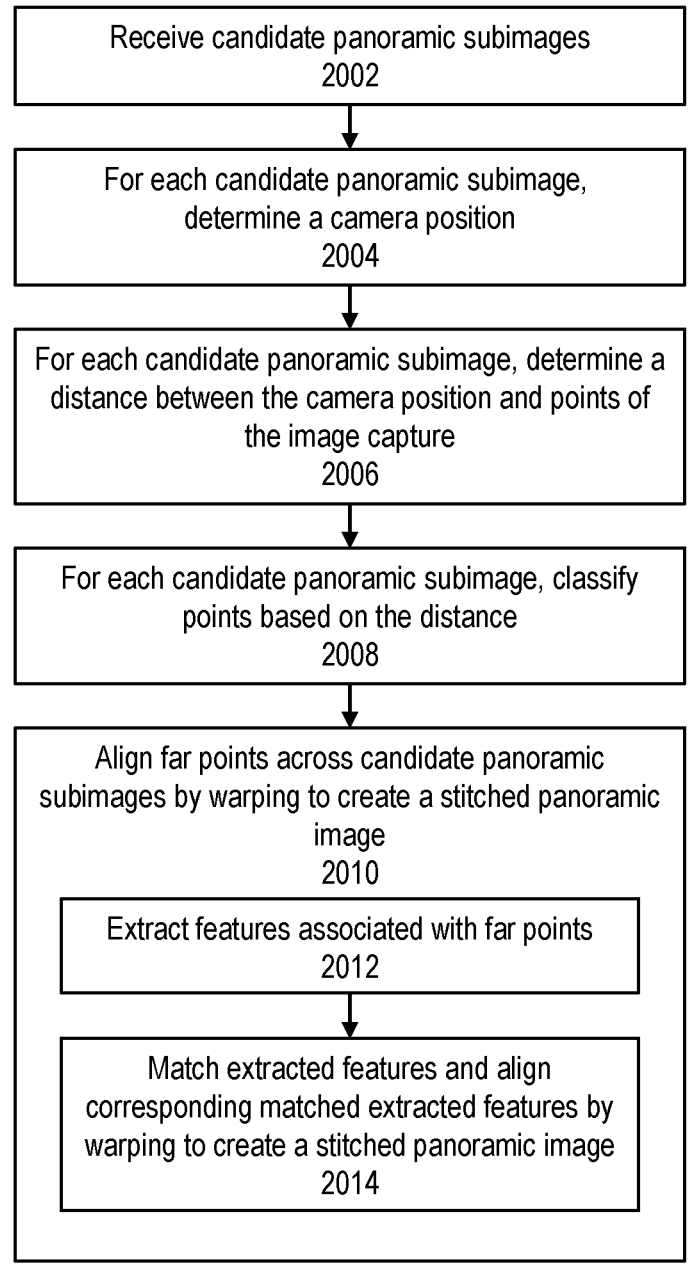
FIG. 20 illustrates a method for creating a stitched panoramic image based on a distance between a camera position associated with a candidate panoramic subimage and points of the candidate panoramic subimage, according to some embodiments.

FIG. 20 illustrates a method for creating a stitched panoramic image based on a distance between a camera position associated with a candidate panoramic subimage and points of the candidate panoramic subimage, according to some embodiments. At step 2002, image captures are received that are candidate panoramic subimages. At step 2004, for each of the candidate panoramic subimages, a camera position is determined. In some embodiments, at step 2004, for each of the candidate panoramic subimages, a camera pose is determined, wherein the camera pose includes a camera position and a camera orientation. At step 2006, for each of the candidate panoramic subimages, a distance between the camera position associated with the candidate panoramic subimage and points of the candidate panoramic subimage is determined. The distance between the camera position and a point can be referred to as the depth of the point. In some embodiments, at step 2006, for each of the candidate panoramic subimages, a distance between the camera pose associated with the candidate panoramic subimage and points of the candidate panoramic subimage is determined.

In some embodiments, structure from motion techniques can be used to determine the distance. In some embodiments, the candidate panoramic subimage includes image data (e.g., color information) and depth data (e.g., depth information). In these embodiments, the depth data can be used to determine the distance. The depth data can be from a depth sensor, such as a LiDAR sensor or a time-of-flight sensor, embedded within a data capture device (such as a smartphone or tablet computer) that is simultaneously capturing the image data. In these embodiments, the depth data can be used to determine the distance.

At step 2008, for each of the candidate panoramic subimages, the points of the candidate panoramic subimage are classified based on the distance between the camera position associated with the candidate panoramic subimage the points of the candidate panoramic subimage. If the distance is greater than or equal to a threshold distance value, the point can be classified as a far point—a point that is far from the camera position. If the distance is less than the threshold distance value, the point can be classified as a near point—a point that is close to the camera position. The threshold distance value can be an absolute value or a relative value.

At step 2010, the far points of each of the candidate panoramic subimages are aligned to their corresponding far points across candidate panoramic subimages by warping each candidate panoramic subimage to a registration plane, such as a respective other candidate panoramic subimage, to create a stitched panoramic image of the input candidate panoramic subimages. In some embodiments, the near points of each of the candidate panoramic subimages can be disregarded.

In some embodiments, step 2010 can include steps 2012 and 2014. At step 2012, one or more features associated with the far points are extracted. The features can be extracted utilizing scale-invariant feature transform (SIFT) or SuperPoint, though other feature detection means such as features from accelerated segment test (FAST), speeded up robust features (SURF), binary robust independent elementary features (BRIEF), or oriented FAST and rotated BRIEF (ORB) may also be utilized. At step 2014, the extracted features associated with the far points are matched, for example utilizing SuperGlue, and aligned to their corresponding matched extracted features associated with the far points across candidate panoramic subimages by warping each of the candidate panoramic subimages to a registration plane, such as a respective other candidate panoramic subimage, to create a stitched panoramic image of the input candidate panoramic subimages.

As mentioned above, in some embodiments, panoramic stitching approaches may equally consider all points within image captures. That is to say that these panoramic stitching approaches may equally consider points that are associated with or correspond to a subject of interest and points that are not associated with or correspond to the subject of interest.

The subject of interest can be known or determined. For example, image captures can have a subject of interest such as a building (e.g., a residential building or a commercial building). The aforementioned panoramic stitching approaches can be improved upon by considering points that are associated with or correspond to the subject of interest, and, in some embodiments, not considering, or disregarding, points that are not associated with or correspond to the subject of interest. Continuing the previous example, the improved panoramic stitching approaches can consider points that are associated with or correspond to the building, and not consider, or disregard, points that are not associated with or correspond to the building, such as those that are associated with or correspond to the sidewalk or the yard.

Figure 21:
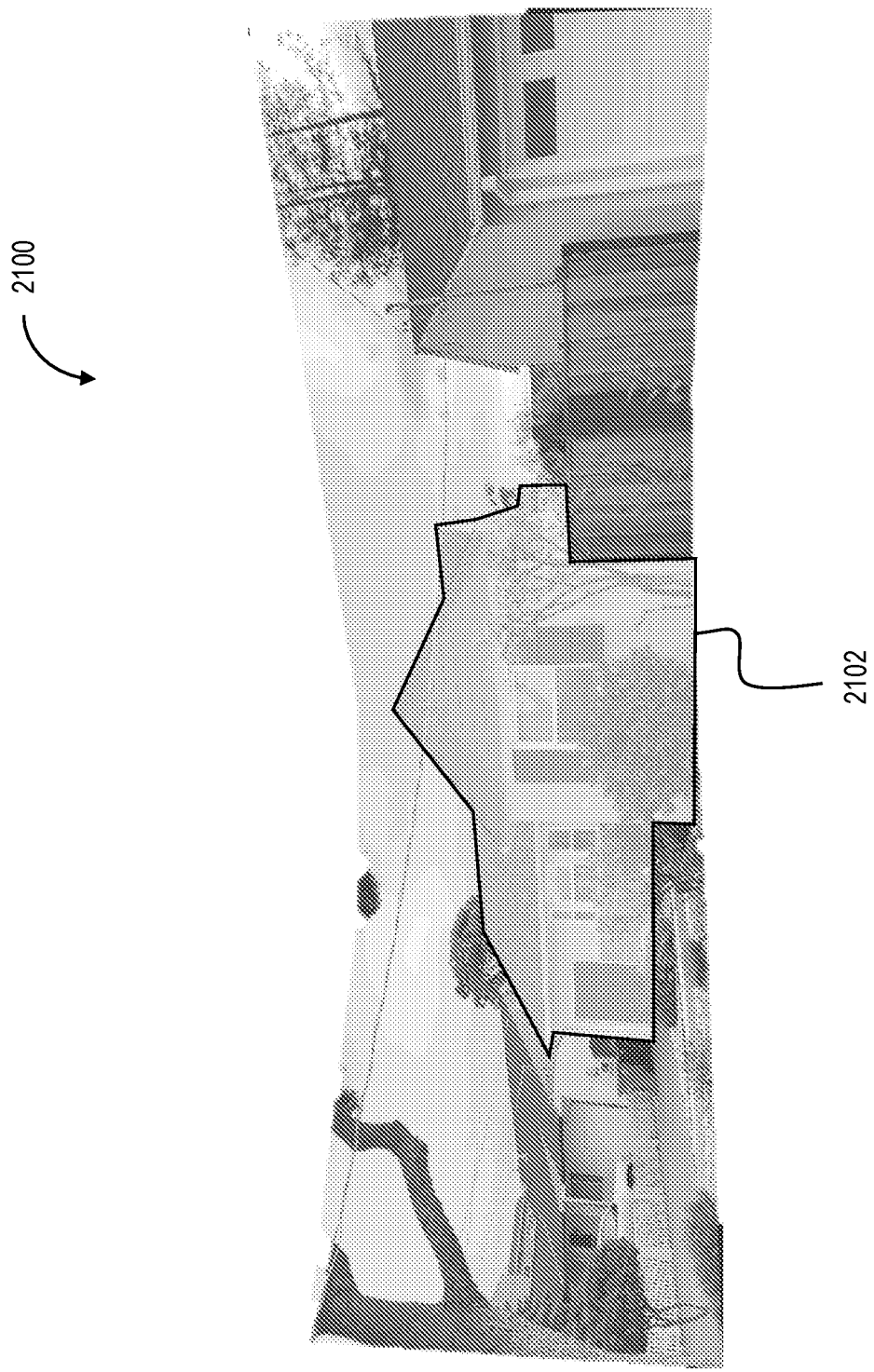
FIG. 21 illustrates a panoramic image stitched utilizing panoramic stitching approaches that consider points that are associated with or correspond to a subject of interest, according to some embodiments.

FIG. 21 illustrates panoramic image 2100, according to some embodiments. Panoramic image 2100 is stitched utilizing panoramic stitching approaches described above that consider points that are associated with or correspond to a subject of interest. The subject of interest of panoramic image 2100 is house 2102. Points that are associated with or correspond to house 2102 are considered when stitching images to generate panoramic image 2100, and, in some embodiments, points that are not associated with or correspond to house 2102 are not considered, or disregarded, when stitching panoramic image 2100.

Figure 22:
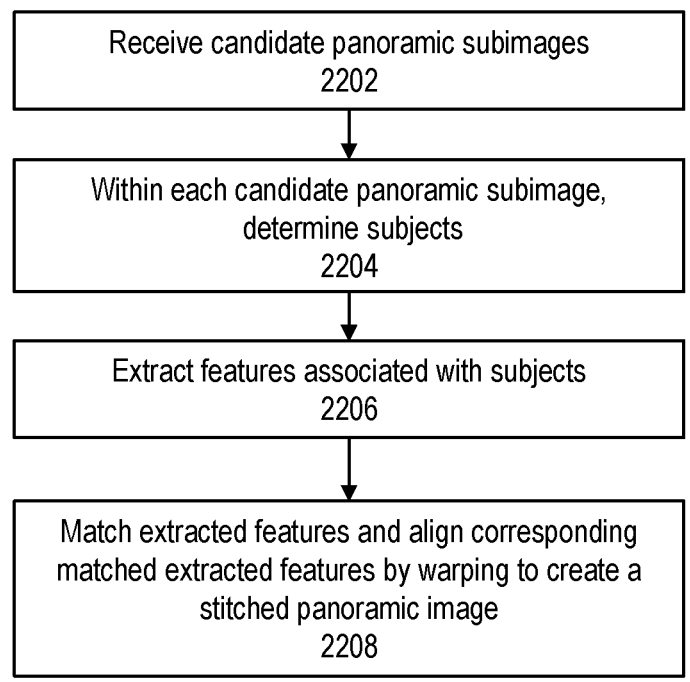
FIG. 22 illustrates a method for creating a stitched panoramic image based on a subject of interest, according to some embodiments.

FIG. 22 illustrates a method for creating a stitched panoramic image based on a subject of interest, according to some embodiments. At step 2202, image captures are received that are candidate panoramic subimages. At step 2204, within each of the candidate panoramic subimages, one or more subjects of interest are determined. The subjects of interest can be determined using image segmentation and its different techniques, such as, for example, region-based segmentation, edge detection segmentation, and segmentation-based clustering. Image segmentation and its different techniques create a mask for each object within the candidate panoramic subimage. The objects in the candidate panoramic subimage can be classified using semantic segmentation or instance segmentation. Each subject of interest can include one or more objects. Identifying objects or a subject of interest with segmentation tools is described further in co-owned U.S. patent application Ser. No. 17/163,043, the contents of which are hereby incorporated by reference in their entirety.

At step 2206, features that are associated with or correspond to the subject of interest are extracted. The features can be extracted utilizing scale-invariant feature transform (SIFT) or SuperPoint, though other feature detection means such as features from accelerated segment test (FAST), speeded up robust features (SURF), binary robust independent elementary features (BRIEF), or oriented FAST and rotated BRIEF (ORB) may also be utilized. At step 2208, the extracted features that are associated with or correspond to the subject of interest are matched, for example utilizing SuperGlue and aligned to their corresponding matched extracted features across candidate panoramic subimages by warping each of the panoramic subimages to a registration plane, such as a respective other candidate panoramic subimage, to create a stitched panoramic image of the input candidate panoramic subimages.

By selecting features no closer to a camera than the features of the subject of interest, or selecting only those features corresponding to the subject of interest a panoramic stitching pipeline reduces the depth variation of the points used for reconstruction. Controlling for depth variation in turn mitigates the impact of any parallax error. For example, referring back to FIG. 19, the car bumper is significantly warped while the subject of interest maintains geometric proportions. Panoramic 1900 may therefore be used in a 3D reconstruction pipeline despite the presence of parallax error, as the relevant object to be constructed has maintained its geometric value.

A panoramic image can be used in 3D model generation. Virtual camera parameters associated with a virtual camera associated with the panoramic image can be used, and may be necessary, for the 3D model generation such as by localizing other real cameras that view similar features as in the panoramic image. The virtual camera parameters can describe various properties of the virtual camera such as, for example, information related to one or more real camera makes and models, one or more exposure values (e.g., shutter speed, aperture, ISO), one or more real lens makes and models, one or more focal lengths/fields of view, one or more dates, one or more times, one or more poses (e.g., positions and orientations), and the like. The virtual camera parameters can be related to one or more real camera parameters associated with one or more real cameras associated with one or more images that constitute the panoramic image.

Figure 23:
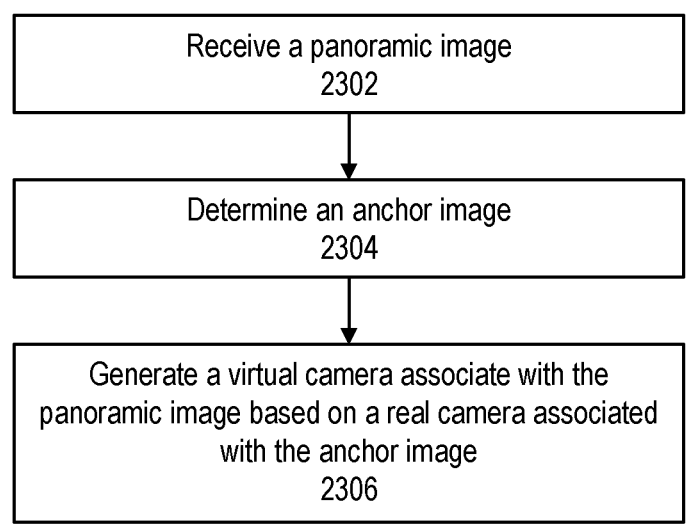
FIG. 23 illustrates a method of generating a virtual camera associated with a panoramic image, according to some embodiments.

In some embodiments, a panoramic image is input to a virtual camera generation process. FIG. 23 illustrates a method of generating a virtual camera associated with a panoramic image, according to some embodiments.

At step 2302, a panoramic image is received. The panoramic image can include visual data, geometric data, or both. In some embodiments, the panoramic image is a two-dimensional image. The panoramic image includes, or is composed of, two or more subimages. Each subimage of the two or more subimages can include visual data, geometric data, or both. In some embodiments, each subimage of the two or more subimages is a 2D image. Each subimage of the two or more subimages has a real camera associated with it. Real camera parameters associated with a real camera can describe various properties of the real camera at the time of image capture, such as, for example, information related to camera make and model, exposure values (e.g., shutter speed, aperture, ISO), lens make and model, focal length/field of view, date, time, pose (e.g., position and orientation), and the like.

At step 2304, an anchor image of the two or more subimages is determined. In some embodiments, determining the anchor image includes determining a minimally distorted image (e.g., underwent the least warping during the panoramic generation stage) of the two or more subimages. Image distortion of an image of the two or more subimages can be determined relative to one or more image planes of the panoramic image, and relative to one or more other subimages. In some embodiments, determining the anchor image includes determining a middle, or center, image of the two or more subimages. In some embodiments, the minimally distorted image and the middle, or center, image are the same image. In some embodiments, the minimally distorted image and the middle, or center, image are different images.

At step 2306, a virtual camera associated with the panoramic image is generated based on a real camera associated with the anchor image. In some embodiments, generating the virtual camera can include assigning the virtual camera one or more virtual camera parameters based on one or more real camera parameters of the real camera associated with the anchor image. For example, a virtual camera pose of the virtual camera can be assigned based on a real camera pose of the real camera associated with the anchor image. In some embodiments, generating the virtual camera can include assigning the virtual camera one or more virtual camera parameters based on one or more real camera parameters of the real camera associated with the anchor image and one or more real camera parameters of another real camera associated with at least one other subimage that generated the panoramic. For example, a virtual camera field of view of the virtual camera can be assigned based on a real camera field of view of the real camera associated with the anchor image and a real camera field of view of a second real camera associated with at least one other subimage composing the panoramic, such as a subimage that corresponds to a far end of the panoramic image. In this example, the virtual camera field of view is wider, or greater, than the real camera field of view of the anchor image since the virtual camera field of view is a function of the real camera field of view of the anchor image and the real camera field of view of the subimage that correspond to the far end of the panoramic image.

Figure 24A:
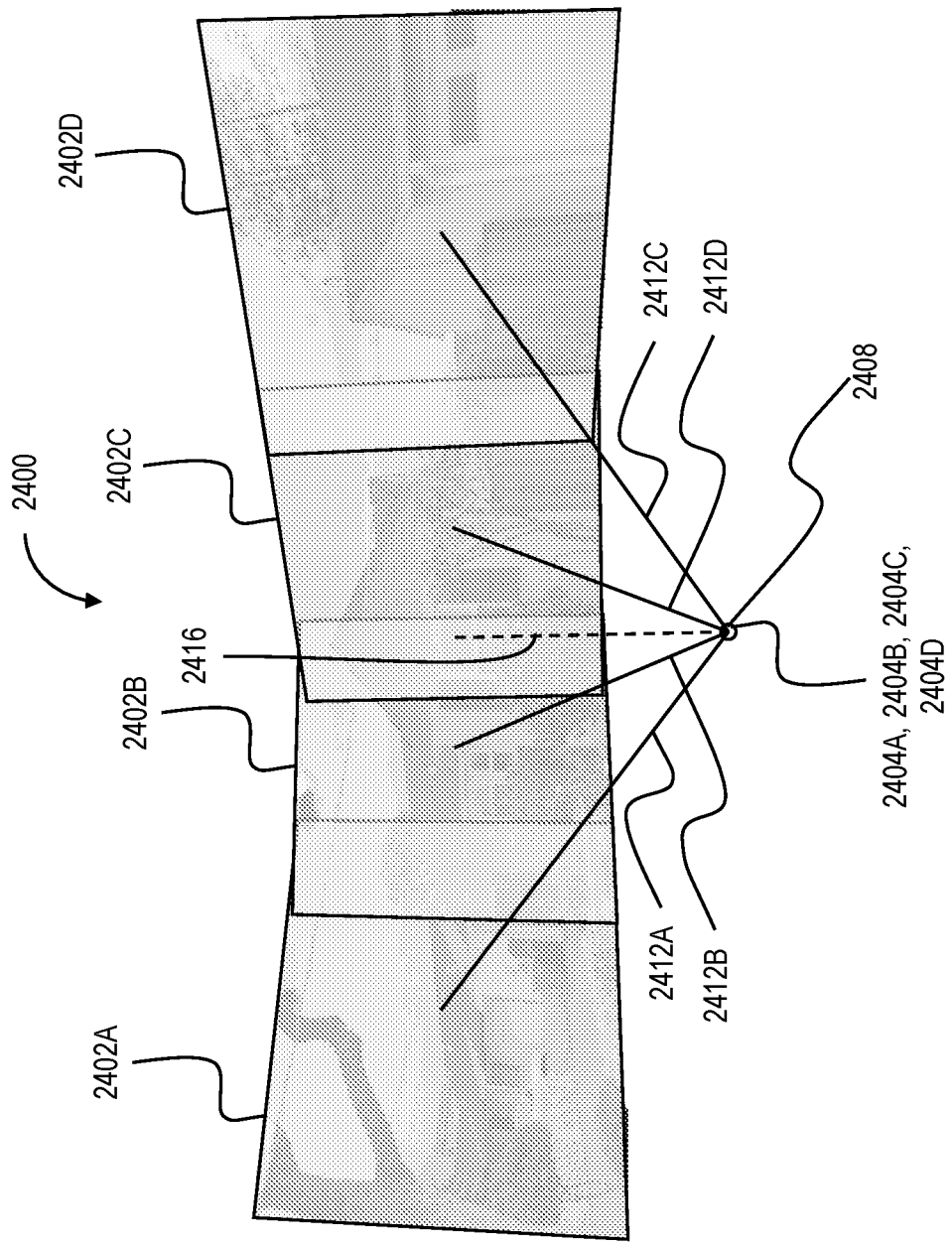

FIGS. 24A and 24B illustrate panoramic image 2400, according to some embodiments. As mentioned previously, panoramic image capture techniques subject real cameras to pose change for successive image captures, where the pose change can be rotation, translation, or both. FIG. 24A illustrates rotation changes and FIG. 24B illustrates rotation and translation changes.

Panoramic image 2400 can be received. Panoramic image 2400 includes, or is composed of, images 2402A-2402D. Each image 2402A-2402D has real camera 2404A-2404D/2406A-D associated with it. As illustrated in FIG. 24A, each real camera 2404A-2404D associated with each image 2402A-2402D have a same origin position, but different orientations/rotations relative to each other. As illustrated in FIG. 24B, each real camera 2406A-2406D associated with each image 2402A-2402D have different positions and different orientations/rotations relative to each other. Real camera parameters associated with real cameras 2404A-2404D/2406A-2406D can describe various properties of real cameras 2404A-2404D/2406A-2406D at the time of capture of images 2402A-2402D.

An anchor image of images 2402A-2402D is determined. In some embodiments, determining the anchor image includes determining a minimally distorted image (e.g., underwent the least warping during the panoramic generation stage) of images 2402A-2402D. It can be determined image 2402B is the minimally distorted image. In these embodiments, image 2402B can be referred to as the anchor image. In some embodiments, determining the anchor image includes determining a middle, or center, image of images 2402A-2402D. It can be determined that 2402B is the middle, or center, image. In these embodiments, image 2402B can be referred to as the anchor image. As illustrated in FIGS. 24A and 24B, the minimally distorted image and the middle, or center, image are the same image (i.e., image 2402B).

Virtual camera 2408/2410 associated with panoramic image 2400 is generated based on real camera 2404B/2406B associated with the anchor image (i.e., image 2402B). In some embodiments, generating virtual camera 2408/2410 can include assigning virtual camera 2408/2410 one or more virtual camera parameters based on one or more real camera parameters of real camera 2404B/2406B associated with image 2402B. For example, a virtual camera pose of virtual camera 2408/2410 can be assigned based on a real camera pose of real camera 2404B/2406B. In some embodiments, generating virtual camera 2408/2410 can include assigning virtual camera 2408/2410 one or more virtual camera parameters based on one or more real camera parameters of real camera 2404B/2406B associated with image 2402B and one or more real camera parameters of a real camera associated with at least one other image, such as image real camera 2404A/2406A associated with 2402A, real camera 2404C/2406C associated with 2402C, or real camera 2404D/2406D associated with 2402D. For example, a virtual camera field of view of virtual camera 2408/2410 can be assigned based on a real camera field of view of real camera 2404B/2406B and a real camera field of view of at least one other real camera associated with at least one other image, such as real cameras 2404A/2406A and 2404D/2406D that correspond to the far ends of panoramic image 2400. In this example, the virtual camera field of view of panoramic image 2400 is wider, or greater, than the real camera field of view of real cameras 2404B/2406B since the virtual camera field of view is a function of the real camera field of view of real cameras 2404B/2406B and the real camera fields of view of real cameras 2404A/2406A and 2404D/2406D that correspond to the far ends of panoramic image 2400.

Figure 25:
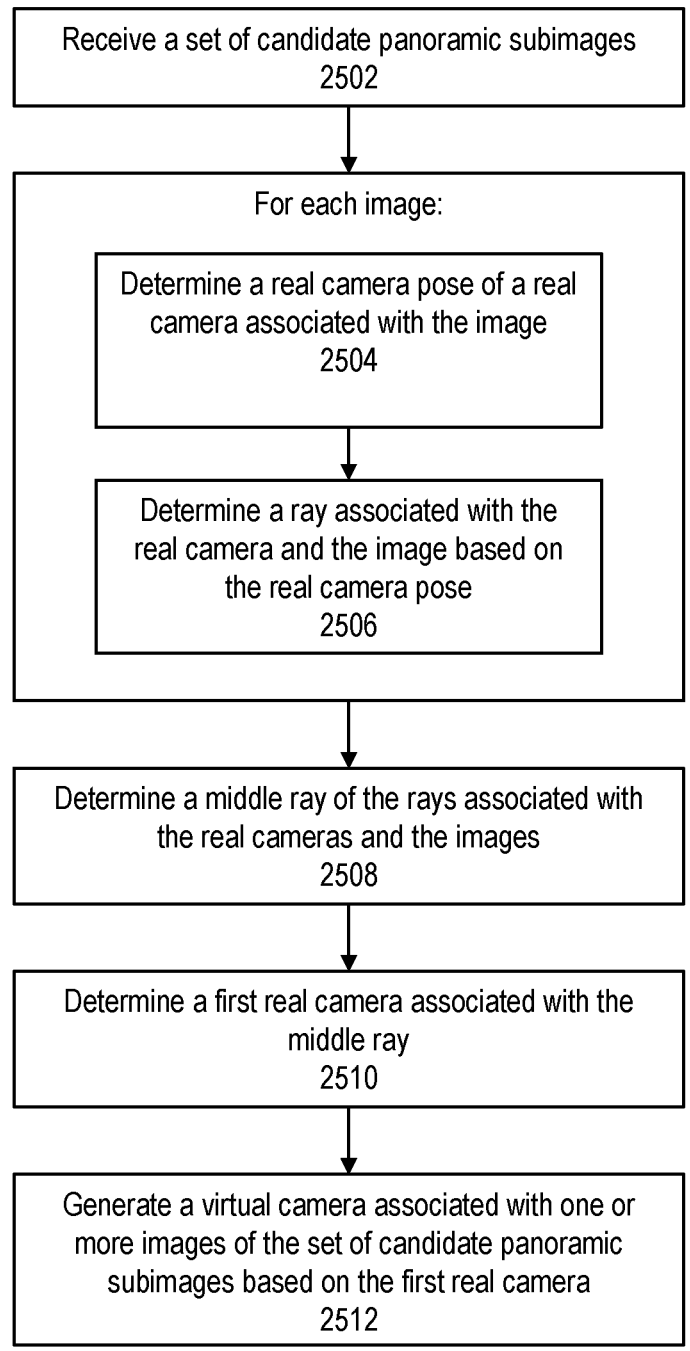
FIG. 25 illustrates a method of generating a virtual camera associated with two or more candidate panoramic subimages, according to some embodiments.

In some embodiments, a set of candidate panoramic subimages is input to a virtual camera generation process. FIG. 25 illustrates a method of generating a virtual camera associated with two or more candidate panoramic subimages, according to some embodiments.

At step 2502, a set of candidate panoramic subimages are received. Each image of the set of candidate panoramic subimages can include visual data, geometric data, or both. In some embodiments, each image of the set of candidate panoramic subimages is a 2D image. In some embodiments, the set of candidate panoramic subimages includes sequential images. In some embodiments, the set of candidate panoramic subimages constitute a panoramic image. Each image of the set of candidate panoramic subimages has a real camera associated with it. Real camera parameters associated with a real camera can describe various properties of the real camera at the time of image capture, such as, for example, information related camera make and model, exposure values (e.g., shutter speed, aperture, ISO), lens make and model, focal length/field of view, date, time, pose (e.g., position and orientation), and the like.

At step 2504, for each image of the set of candidate panoramic subimages, a real camera pose of a real camera associated with the image is determined. At step 2506, for each image of the set of candidate panoramic subimages, a ray associated with the real camera and the image is determined based on the real camera pose. The ray associated with the real camera and the image coincides with a real camera optical axis associated with the real camera and an image center (i.e., the center of the image).

At step 2508, a middle ray of the rays associated with the real cameras and the images is determined. In some embodiments, the middle ray is the median of the rays associated with the real cameras and the images. In some embodiments, the middle ray is the mean of the rays associated with the real cameras and the images.

In some embodiments, a cone based on the rays associated with the real cameras and the images is determined. The cone can be determined by determining an angle between a first ray of the rays and a second ray of the rays. The first ray can be associated with a far left image of the set of candidate panoramic subimages, and the second ray can be associated with a far right image of the set of candidate panoramic subimages. In these embodiments, the middle ray is based on the angle between the first ray and the second ray. For example, the middle ray can be based on a bisection of the angle between the first ray and the second ray.

At step 2510, a first real camera associated with the middle ray is determined. In some embodiments, determining the first real camera associated with the middle ray can include determining a real camera of the real cameras that has an optical axis orientation substantially parallel with, or closest to parallel with, the middle ray. In some embodiments, determining the first real camera associated with the middle ray can include determining a ray associated with a real camera and an image that is substantially parallel with, or closest to parallel with, the middle ray, where the first real camera is the real camera associated with the ray that is closest to the middle ray.

At step 2512, a virtual camera associated with one or more images of the set of candidate panoramic subimages is generated based on the first real camera. In some embodiments, the virtual camera is associated with a panoramic image that includes, or is composed of, two or more images of the set of candidate panoramic subimages. In some embodiments, generating the virtual camera can include assigning the virtual camera one or more virtual camera parameters based on one or more real camera parameters of the first real camera. For example, a virtual camera pose of the virtual camera can be assigned based on a real camera pose of the first real camera. In some embodiments, generating the virtual camera can include assigning the virtual camera one or more virtual camera parameters based on one or more first real camera parameters of the first real camera and one or more real camera parameters of at least one other real camera. For example, a virtual camera field of view of the virtual camera can be assigned based on a first real camera field of view of the first real camera and a real camera field of view of at least one other real camera, such as real cameras associated with images that correspond to the far ends of the set of images. In this example, the virtual camera field of view is wider, or greater, than the first real camera field of view of the first real camera since the virtual camera field of view is a function of the first real camera field of view of the first real camera and real camera fields of view of the real cameras associated with the images that correspond to the far ends of the set of images.

Referring again to FIGS. 24A and 24B, a set of candidate panoramic subimages including images 2402A-2402D are received. A real camera pose for each of real cameras 2404A-D/2406A-D is determined. Rays 2412A-2412D/2414A-2414D associated with real cameras 2404A-2404D/2406A-2406D are determined based on the real camera poses of real camera 2404A-2404D/2406A-2406D, respectively. Rays 2412A-2412D/2414A-2414D coincide with a real optical axis of real cameras 2404A-2404D/2406A-2406D and their respective image centers (i.e., the center of image 2402A-2402D).

Middle ray 2416/2418 of rays 2412A-2412D/2414A-2414D is determined. In some embodiments, middle ray 2416/2418 is the median of rays 2412A-2412D/2414A-2414D. In some embodiments, middle ray 2416/2418 is the mean of rays 2412A-2412D/2414A-2414D. As illustrated in FIGS. 24A and 24B, the median and the mean of rays 2412A-2412D/2414A-2414D are the same (e.g., middle ray 2416/2418).

In some embodiments, a cone (not illustrated) based on rays 2412A-2412D/2414A-2414D is determined. The cone can be determined by determining an angle between ray 2412A/2414A and ray 2412D/2414D. In these embodiments, middle ray 2416/2418 is based on the angle between ray 2412A/2414A and ray 2412D/2414D. For example, middle ray 2416/2418 is based on a bisection of the angle between ray 2412A/2414A and ray 2412D/2414D.

A first real camera associated with middle ray 2416/2418 is determined. In some embodiments, determining the first real camera can include determining a real camera of real cameras 2404A-2404D/2406A-2406D that has an optical axis orientation substantially parallel with, or closest to parallel with, middle ray 2416/2418. In these embodiments, the first real camera can be either real camera 2404B/2406B or 2404C/2406C, as each have an optical axis equidistant from middle ray 2416/2418. For this example, the first real camera will be real camera 2404B/2406B. In some embodiments, determining the first real camera can include determining ray 2412A-2412D/2414A-2414D that is substantially parallel with, or closest to parallel with, middle ray 2416/2418, where the first real camera is real camera 2404A-2404D/2406A-2406D that is associated with ray 2412A-2412D/2414A-2414D that is substantially parallel with, or closest to parallel with, middle ray 2416/2418. In these embodiments, the first real camera can be either real camera 2404B/2406B or 2404C/2406C, as each ray 2412B/2414B and 2412C/2414C are equidistant from middle ray 2416/2418. For this example, the first real camera will be real camera 2404B/2406B.

Virtual camera 2408/2410 associated with one or more images 2402A-2402D is generated based on real camera 2404B/2406B (i.e., the first real camera). In some embodiments, virtual camera 2408/2410 is associated with panoramic image 2400. In some embodiments, generating virtual camera 2408/2410 can include assigning virtual camera 2408/2410 one or more virtual camera parameters based on one or more real camera parameters of real camera 2404B/2406B. For example, a virtual camera pose of virtual camera 2408/2410 can be assigned based on a real camera pose of real camera 2404B/2406B. In some embodiments, generating virtual camera 2408/2410 can include assigning virtual camera 2408/2410 one or more virtual camera parameters based on one or more first real camera parameters of real camera 2404B/2406B and one or more real camera parameters of at least one other real camera such as real camera 2404A/2406A, 2404C/2406C, or 2404D/2406D. For example, a virtual camera field of view of virtual camera 2408/2410 can be assigned based on a first real camera field of view of real camera 2404B/2406B and real camera fields of view of at least one other real camera, such as real cameras 2404A/2406A and 2404D/2406D associated with images 2402A and 2402D that correspond to the far ends of the set of images. In this example, the virtual camera field of view of virtual camera 2408/2410 is wider, or greater, than the first real camera field of view of real camera 2404B/2406B since the virtual camera field of view is a function of the first real camera field of view of real camera 2404B/2406B and the real camera fields of view of real cameras 2404A/2406A and 2404D/2406D associated with the images 2402A and 2402D that correspond to the far ends of the set of candidate panoramic subimages.

As mentioned previously, panoramic image capture techniques subject real cameras to pose change for successive image captures, where the pose change can be rotation, translation, or both. In some embodiments, although there may be translation between image captures, it can be assumed the translation is negligible. In these embodiments, instead of determining a real camera pose of a real camera associated with an image for each image, a real camera position of a real camera associated with one image can be determined, and, since it is assumed that translation is negligible, the determined real camera position can be assigned to or shared with the other real cameras. In these embodiments, a real camera orientation of a real camera associated with each image is determined.

Figure 26:
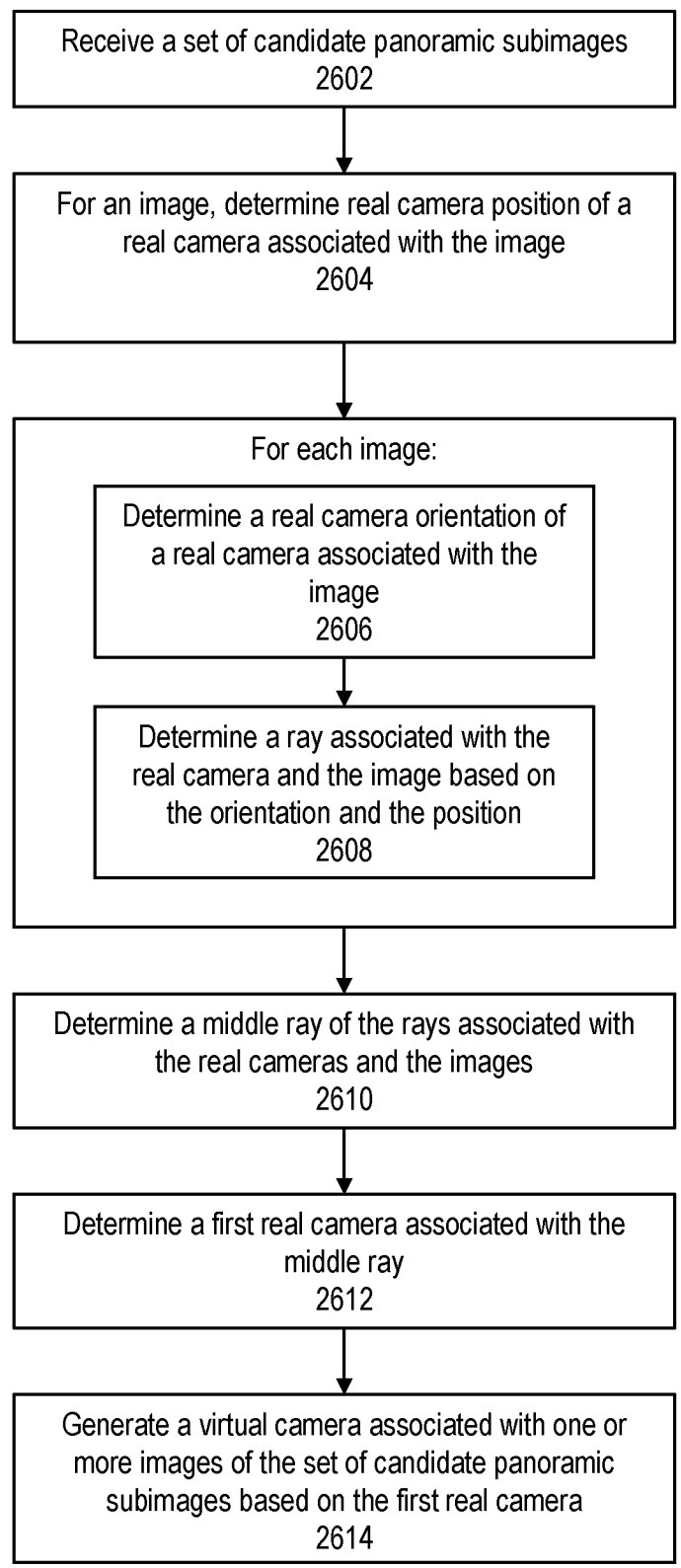
FIG. 26 illustrates a method of generating a virtual camera associated with two or more candidate panoramic subimages, according to some embodiments.

FIG. 26 illustrates a method of generating a virtual camera associated with two or more candidate panoramic subimages, according to some embodiments. Steps 2602, 2610, 2612, and 2614 are similar to steps 2502, 2508, 2510, and 2512, respectively. At step 2604, for an image of the set of candidate panoramic subimages, a real camera position of a real camera associated with the image is determined. At step 2606, for each image of the set of candidate panoramic subimages, a real camera orientation of a real camera associated with the image is determined. Note that at step 2504, a real camera pose was determined, whereas at step 2606, a real camera orientation is determined. At step 2608, for each image of the set of candidate panoramic subimages, a ray associated with the real camera and the image is determined based on the real camera position and the real camera orientation. Note that at step 2506, the ray is determined based on the real camera pose, whereas at step 2608, the ray is determined based on the real camera position and the real camera orientation, which together can be referred to as pose. However, the real camera position may be of a real camera associated with one image, and the real camera orientation may be of a real camera associated with another, different image.

Images captured using an image capture device during an image capture process are used in a panoramic image generation process to generate a panoramic image. The images captured during the image capture process can affect the panoramic image generated during the panoramic image generation process.

To minimize known stitching errors when generating a panoramic image, such as parallax, user feedback signals, such as user guidance markers, can discourage translation of the image capture device more than a threshold translation value. In one example, translation more than a threshold translation value (or translation tolerance) is one that exceeds an acceptable parallax error relationship (e.g., a dioptric relationship between the translation distance of camera pairs and the distance to the subject of the panoramic image as discussed elsewhere in this disclosure). In some embodiments, the translation tolerance is function of the translation between two or more cameras used in generating the panoramic image.

Figures 27A, 27B, 27C:
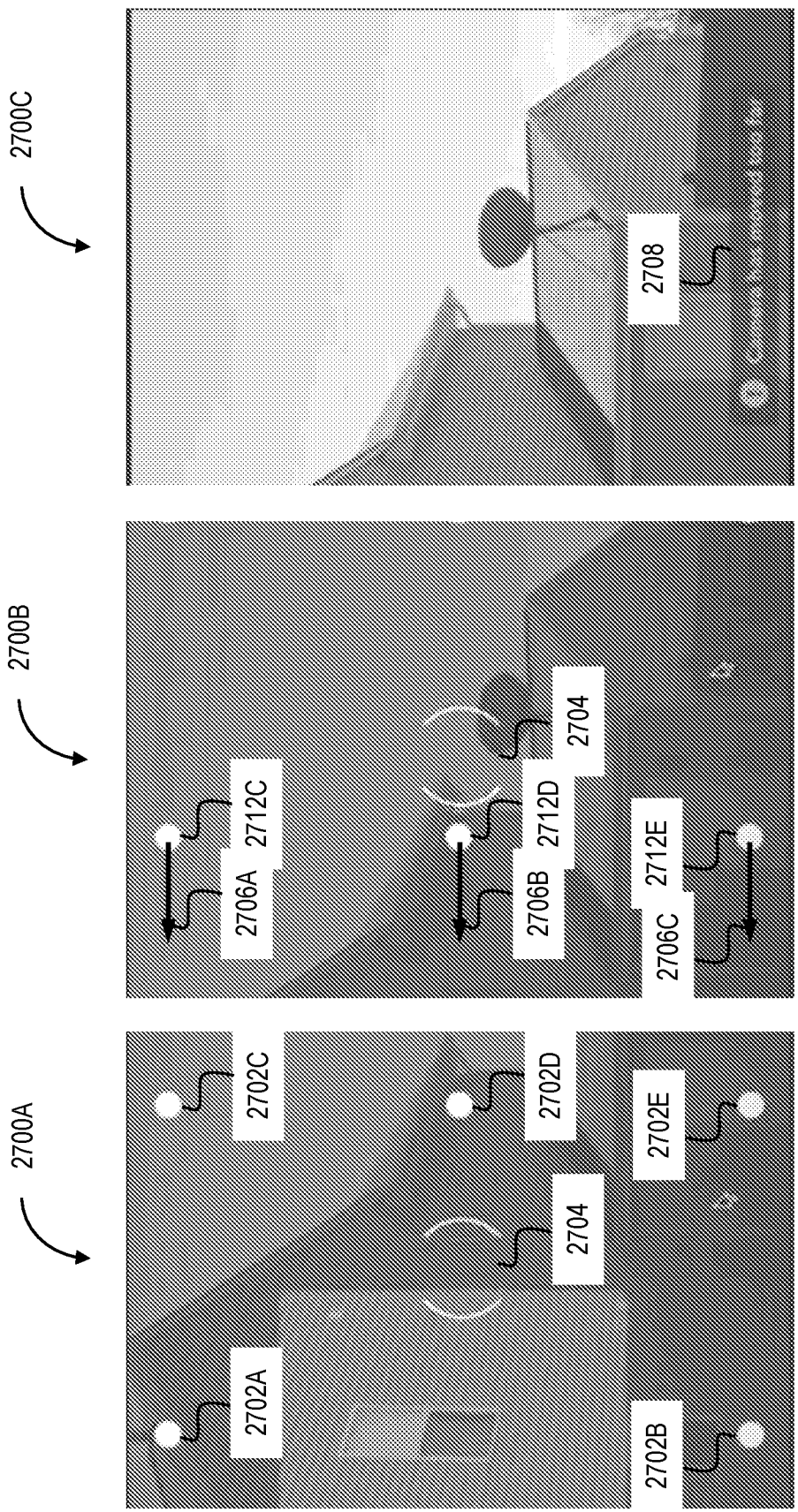
FIGS. 27A-27C illustrate screenshots depicting a capture user interface, according to some embodiments.

FIGS. 27A-27C illustrates screenshots 2700A-2700C depicting a capture user interface, according to some embodiments. The capture user interface can be displayed on a display of a user device, such as an image capture device. The capture user interface can be a part of the image capture process. Screenshot 2700A corresponds to the image capture device at a first pose, screenshot 2700B corresponds to the image capture device at a second pose, and screenshot 2700C corresponds to the image capture device at a third pose. The poses are within a world coordinate system. In this example, the image capture device sequentially transitions (e.g., translates, rotates, or both) from the first pose to the second pose to the third pose.

In some embodiments, user guidance markers are generated relative to a first focal plane of the image capture device at the first pose, though other planes of the imaging system may be used with similar results as described herein. The user guidance markers are points within the world coordinate system. In some embodiments, the user guidance markers are generated at a user guidance markers plane. In some embodiments, the user guidance markers plane is parallel to the first focal plane of the image capture device at the first pose, though other planes of the imaging system can be used with similar results as described herein. The distance between the user guidance markers plane and the first focal plane of the image capture device at the first pose can be fixed. The distance between the user guidance markers plane and the first focal plane of the image capture device at the first pose can be related to, or a function of, a threshold translation value (or translation tolerance). For example, as the translation tolerance decreases the user guidance markers approach the first focal plane.

FIG. 27A illustrates first rendered user guidance markers 2702A-2702E. First rendered user guidance markers 2702A-2702E are user guidance markers that are projected onto a first image plane of the image capture device at the first pose that are within a first field of view of the image capture device at the first pose. First rendered user guidance markers 2702A-2702E are shown on the display of the image capture device. The projection of user guidance markers onto the first image plane is from a first optical center (sometimes referred to as camera origin) of the image capture device at the first pose.

FIG. 27B illustrates second rendered user guidance markers 2712C-2712E. Second rendered user guidance markers 2712C-2712E are user guidance markers that are projected onto a second image plane of the image capture device at the second pose that are within a second field of view of the image capture device at the second pose. Second rendered user guidance markers 2712C-2712E are shown on the display of the image capture device. The projection of user guidance markers onto the second image plane is from a second optical center of the image capture device at the second pose. It will be appreciated that because the user guidance markers are generated relative to the first focal plane, when the camera views those same user guidance markers from the perspective of the second focal plane the user guidance markers rendered as 2712C-2712E have appeared to shift in the display.

Instructions can be displayed on the display of the image capture device as a part of the capture user interface that instruct a user of the image capture device to align reticle 2704 to each rendered user guidance markers. In an attempt to align reticle 2704 to first rendered user guidance marker 2702D, the user may transition (e.g., translate, rotate, or both) the image capture device from the first pose to the second pose to the third pose. As the projection of the user guidance markers generated relative to the first focal plane and are attributed to the first pose, over subsequent camera poses the rendered user guidance markers can responsively transition to the image capture device transitions at a disproportionate rate to the image capture device transitions. In one example, a small transition from the first pose to the second pose results in a large transition from first rendered user guidance markers 2702A-2702E to second rendered user guidance markers 2712C-2712E. In another example, a small transition from the second pose to the third pose results in a large transition from second user guidance markers 2712C-2712E to no displayed user guidance markers as the user guidance markers are now outside the image plane or field of view of the image capture device at the third pose.

Arrows 2706A-2706C in FIG. 27B and message 2708 in FIG. 27C are displayed on the display of the image capture device to notify the user that the image capture device has transitioned more than a threshold translation value (or translation tolerance).

Figure 28A:
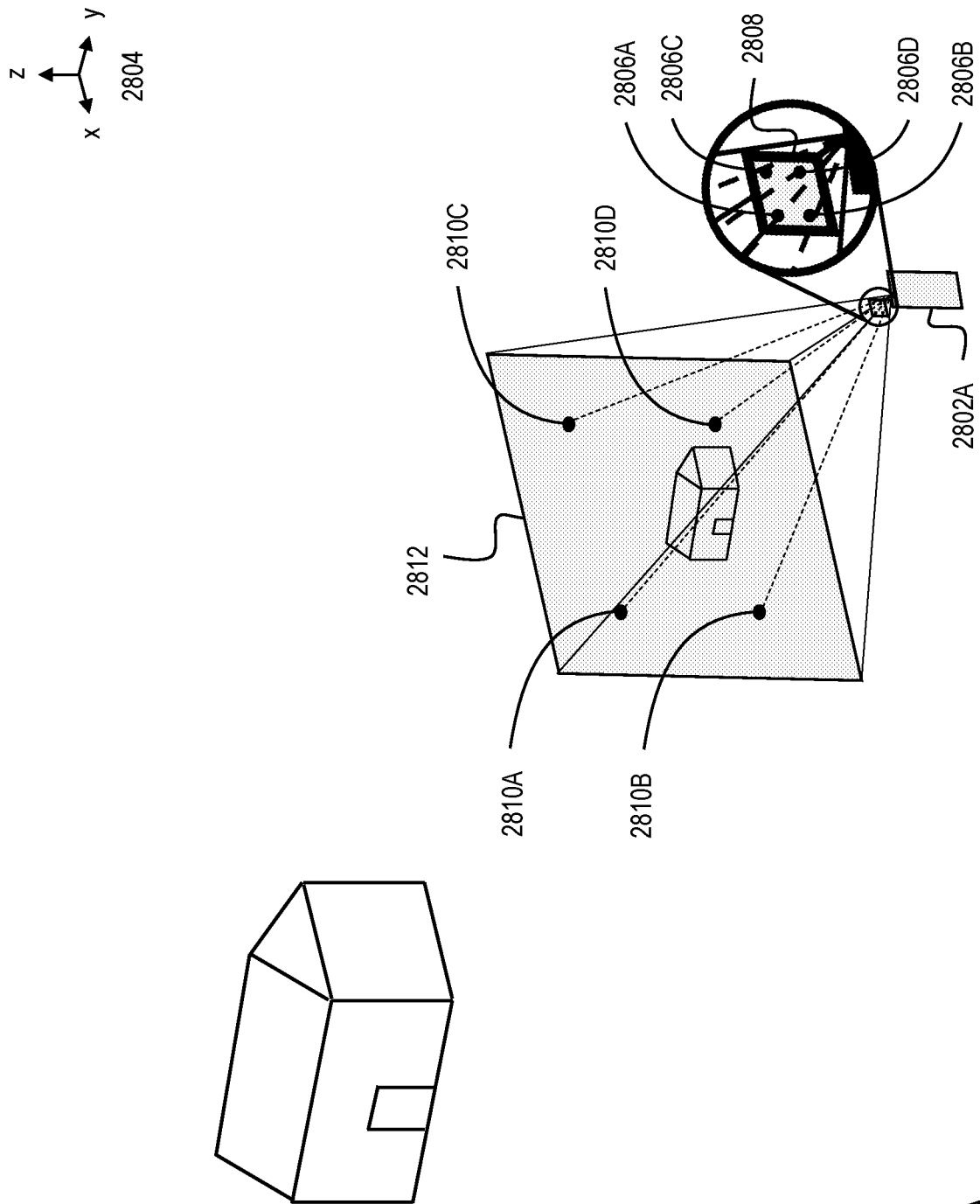
FIGS. 28A-28C illustrates an image capture process, according to some embodiments.
Figure 28B:
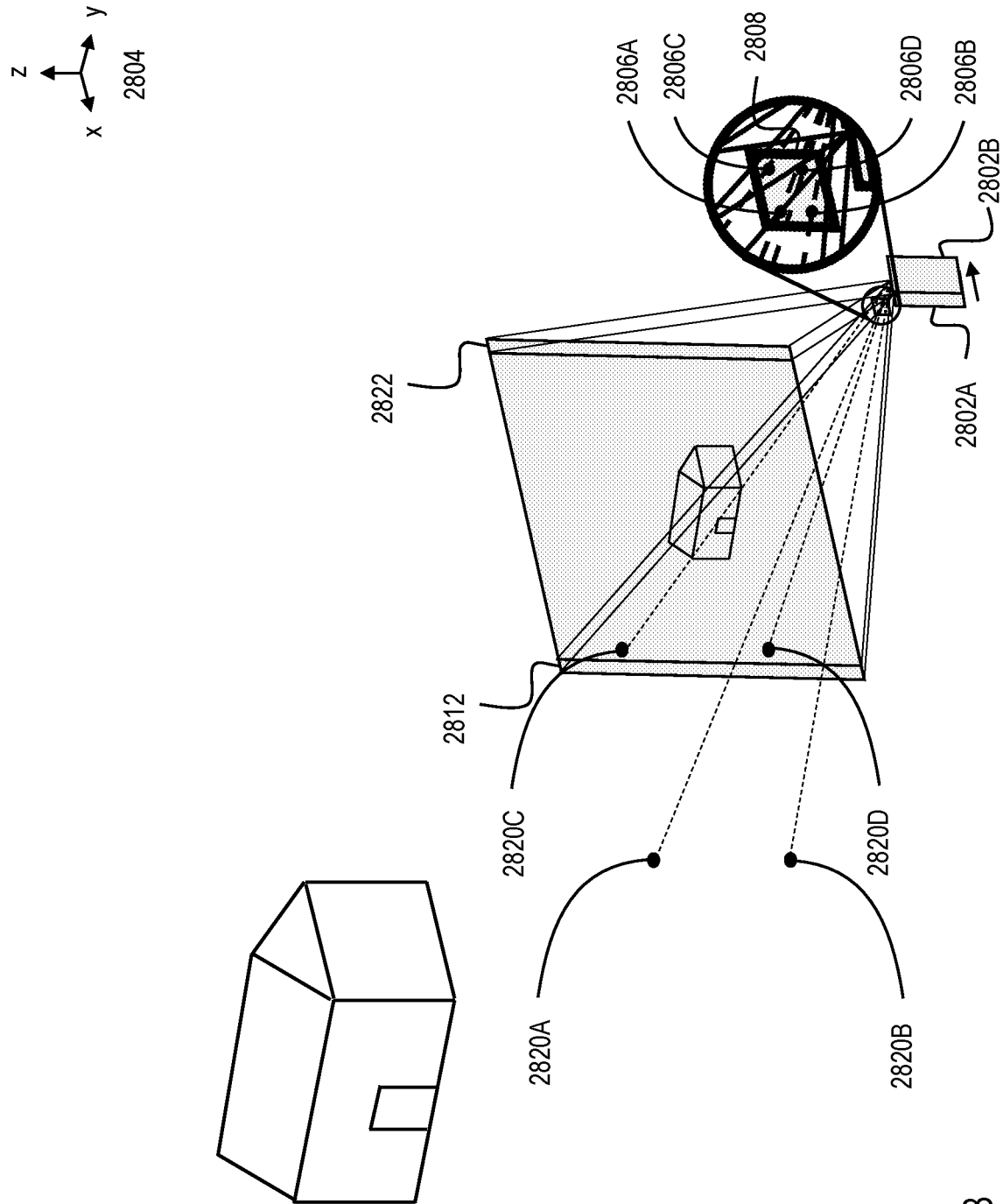
Figure 28C:
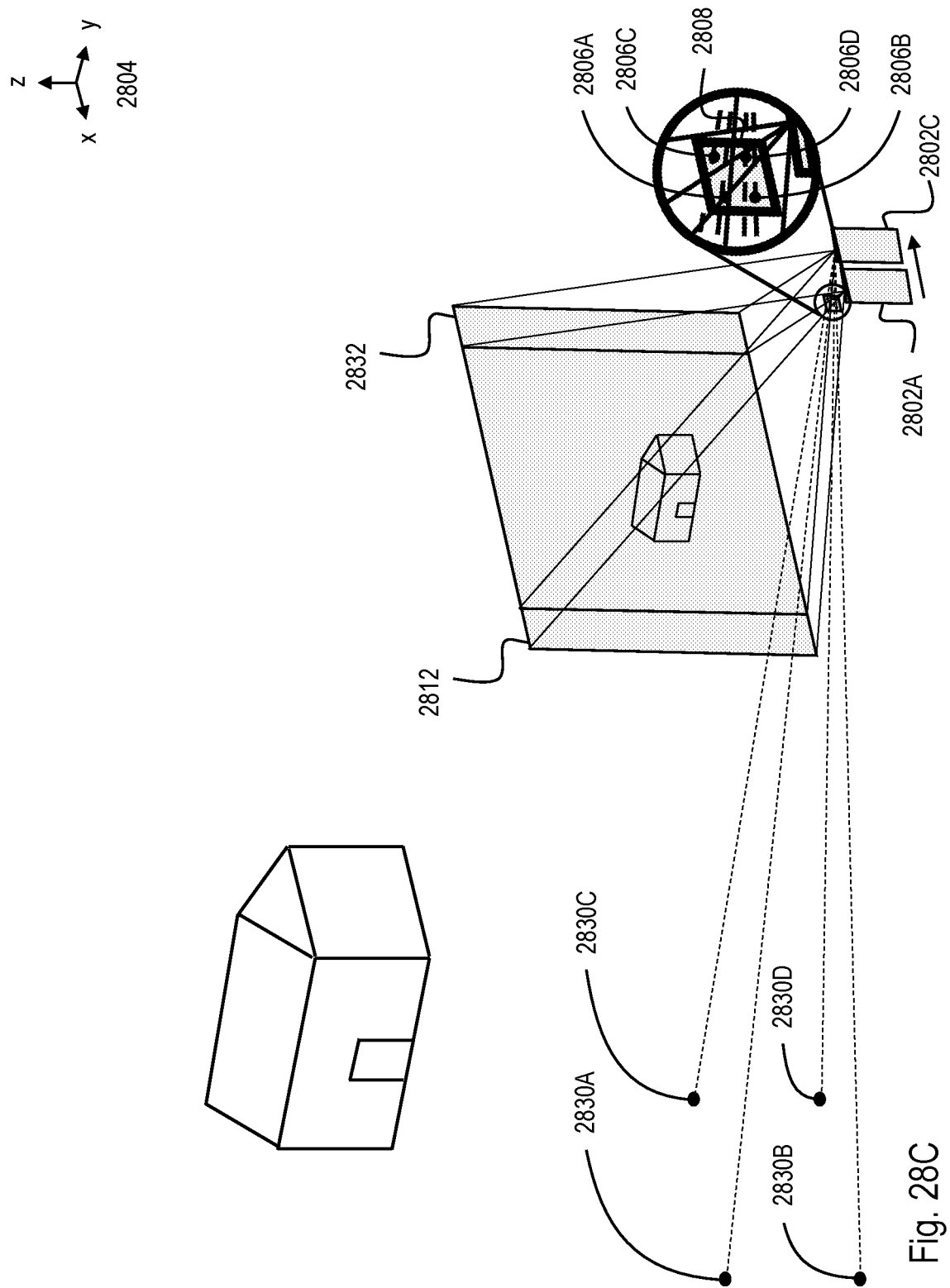

FIGS. 28A-28C illustrate an image capture process, according to some embodiments. FIGS. 28A-28C illustrate an image capture device at different poses. FIG. 28A illustrates the image capture device at first pose 2802A, FIG. 28B illustrates the image capture device at second pose 2802B, and FIG. 28C illustrates the image capture device at third pose 2802C. Poses 2802A-2802C are within world coordinate system 2804. In the example illustrated in FIGS. 28A-28C, the image capture device sequentially transitions (e.g., translates, rotates, or both) from first pose 2802A to second pose 2802B to third pose 280C.

User guidance markers 2806A-2806D are generated relative to a first focal plane (not illustrated) of the image capture device at first pose 2802A. In some embodiments, user guidance markers 2806A-2806D are points projected within world coordinate system 2804. In some embodiments, user guidance markers 2806A-2806D are generated at user guidance markers plane 2808. In some embodiments, user guidance markers plane 2808 is parallel to the first focal plane of the image capture device at first pose 2802A. The distance between user guidance markers plane 2808 and the first focal plane of the image capture device at first pose 2802A can be fixed. The distance between user guidance markers plane 2808 and the first focal plane of the image capture device at first pose 2802A can be related to or a function of a threshold translation value (or translation tolerance).

FIG. 28A illustrates first projected user guidance markers 2810A-2810D. First projected user guidance markers 2810A-2810D are user guidance markers 2806A-2806D projected onto a first image plane (not illustrated) of the image capture device at first pose 2802A. In some embodiments, first projected user guidance markers 2810A-2810D are user guidance markers 2806A-2806D projected onto the first image plane of the image capture device at first pose 2802A from an optical center of the image capture device at first pose 2802A.

First projected user guidance markers 2810A-2810D that are within field of view 2812 of the image capture device at first pose 2802A are displayed on the image capture device. As illustrated in FIG. 28A, first projected user guidance markers 2810A-2810D are within field of view 2812 of the image capture device at first pose 2802A, and thus are displayed on the image capture device.

The image capture device transitions from first pose 2802A to second pose 2802B. FIG. 28B illustrates second projected user guidance markers 2820A-2820D. In some embodiments, second projected user guidance markers 2820A-2820D are user guidance markers 2806A-2806D projected relative to a second image plane of the image capture device at second pose 2802B from an optical center of the image capture device at second pose 2802B.

As illustrated in FIG. 28B, second projected user guidance markers 2820C-2820D are within field of view 2822 of the image capture device at second pose 2802B, and thus are displayed on the image capture device. Second projected user guidance markers 2820A-2820B are not within field of view 2822 of the image capture device at second pose 2802B, and in some embodiments are not displayed on the image capture device.

The image capture device transitions from second pose 2802B to third pose 2802C. FIG. 28C illustrates third projected user guidance markers 2830A-2830D. In some embodiments, third projected user guidance markers 2830A-2830D are user guidance markers 2806A-2806D projected relative to a third image plane of the image capture device at third pose 2802C from an optical center of the image capture device at third pose 2802C.

As illustrated in FIG. 28C, third projected user guidance markers 2830A-2830D are not within field of view 2832 of the image capture device at third pose 2802C, and thus are not displayed on the image capture device.

Placement of the user guidance markers relative to the first pose ensure the projected user guidance markers responsively transition at a disproportionate rate to the image capture device transitions. Placement of the user guidance markers (or the user guidance markers plane) approaching the first focal plane of the image capture device at the first pose induces larger changes in the projected user guidance markers position than a change in camera's translated position. Since the projected user guidance markers transition at a disproportionate rate to the image capture device transitions, and the fields of view of the image capture device typically are fixed during an image capture session, the projected user guidance markers will not be within a field of view or accessible by reticle 2704 on the image capture device display when that image capture device moves more than the threshold translation value (or translation tolerance).

As illustrated in FIGS. 28A and 28B, a small transition from first pose 2802A to second pose 2802B results in a large transition from first projected user guidance markers 2810A-2810D to second projected user guidance markers 2820A-2820D.

Similarly, as illustrated in FIGS. 28B and 28C, a small transition from second pose 2802B to third pose 2802C results in a large transition from second projected user guidance markers 2820A-2820D to third user guidance markers 2830A-2830D.

Figure 29A:
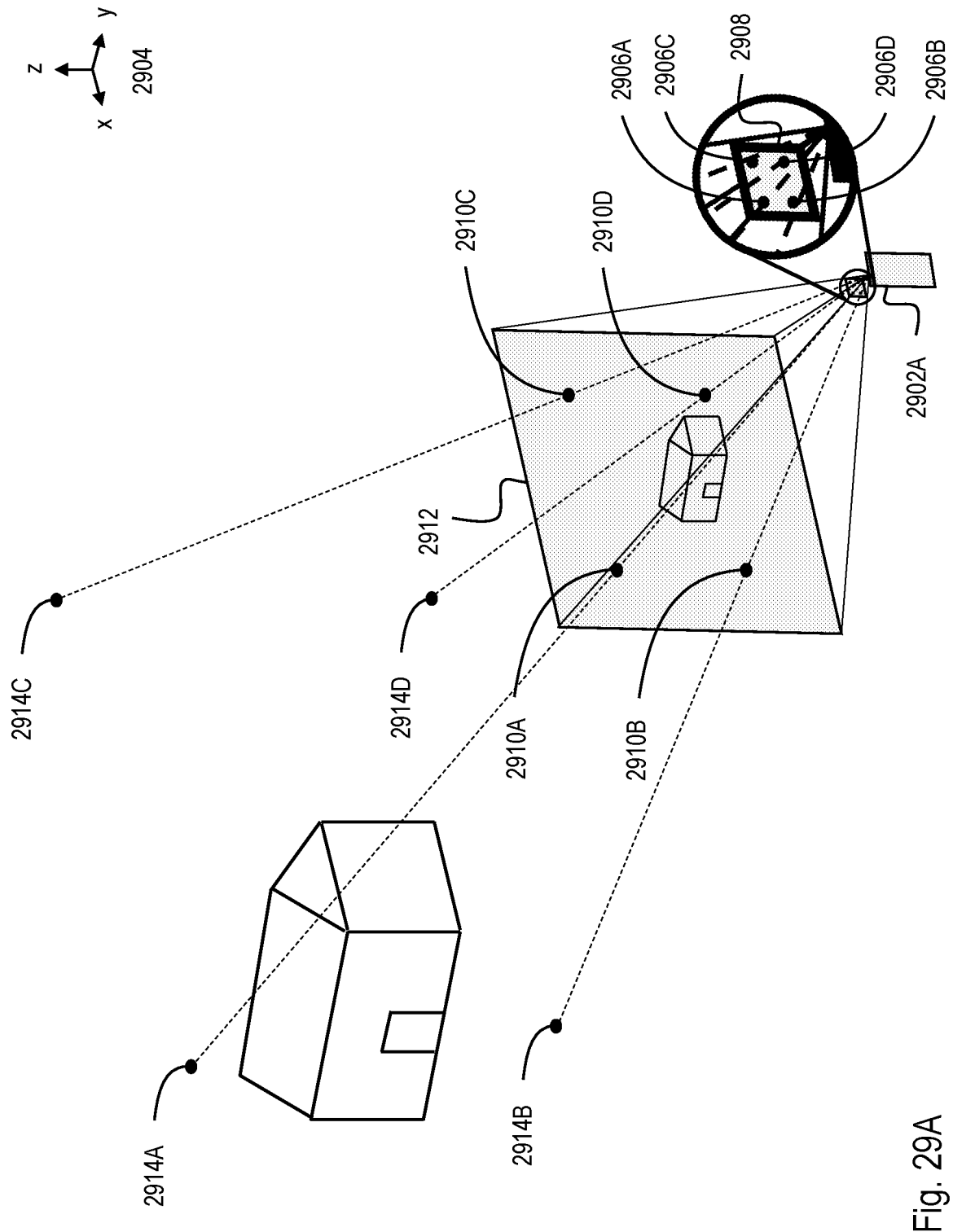
FIGS. 29A-29B illustrate an image capture process, according to some embodiments.
Figure 29B:
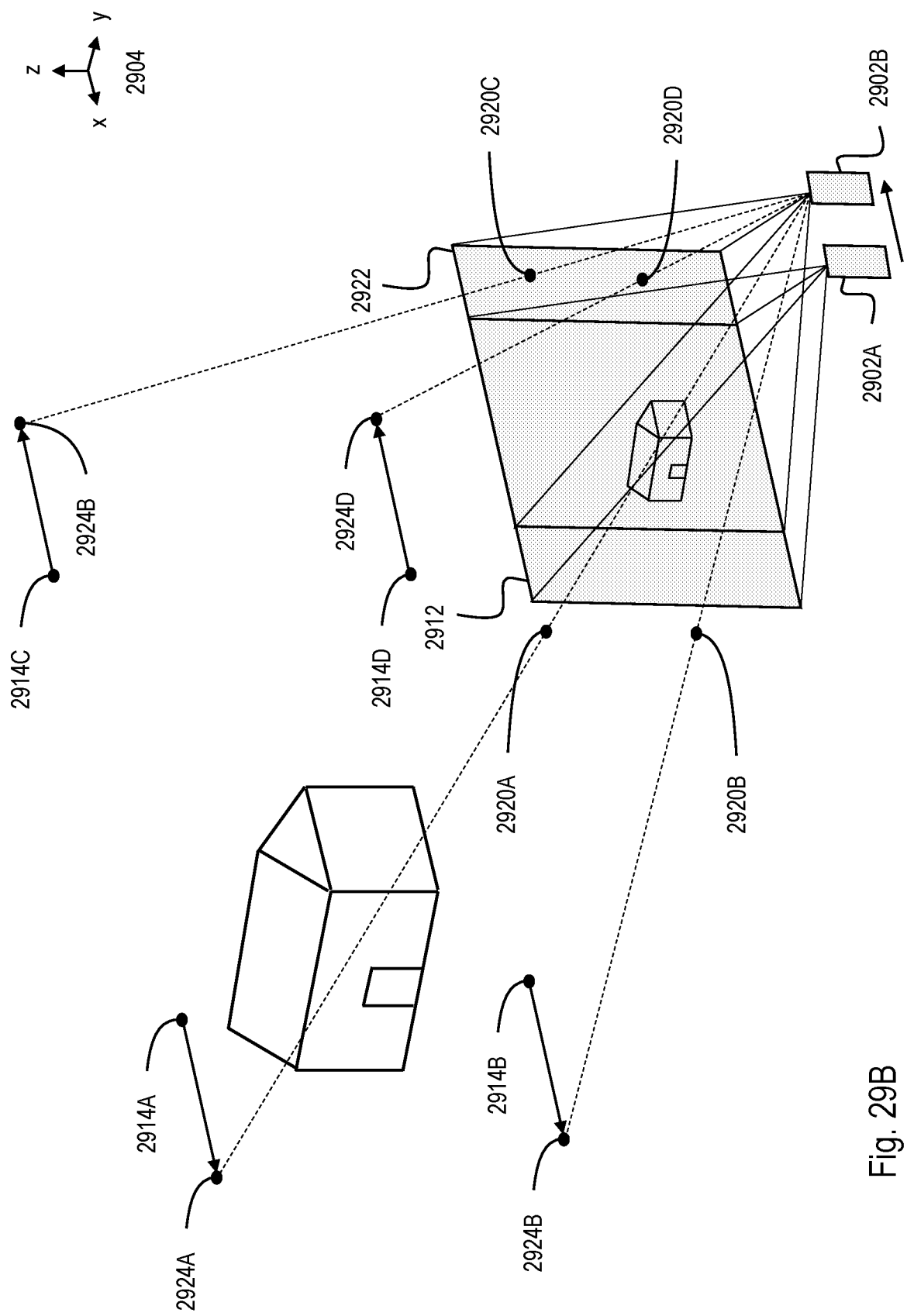

FIGS. 29A-29B illustrate an image capture process, according to some embodiments. FIGS. 29A-29B illustrate an image capture device at different poses. FIG. 29A illustrates the image capture device at first pose 2902A and FIG. 29B illustrates the image capture device at second pose 2902B. Poses 2902A-2902B are within world coordinate system 2904. In the example illustrated in FIG. 29A-29B, the image capture device sequentially transitions (e.g., translates, rotates, or both) from first pose 2902A to second pose 2902B.

User guidance markers 2906A-2906D are generated relative to a first focal plane (not illustrated) of the image capture device at first pose 2902A. In some embodiments, user guidance markers 2906A-2906D are points projected within world coordinate system 2904. In some embodiments, user guidance markers 2906A-2906D are generated at user guidance markers plane 2908. In some embodiments, user guidance markers plane 2908 is parallel to the first focal plane of the image capture device at first pose 2902A. The distance between user guidance markers plane 2908 and the first focal plane of the image capture device at first pose 2902A can be fixed. The distance between user guidance markers plane 2908 and the first focal plane of the image capture device at first pose 2902A can be related to or a function of a threshold translation value (or translation tolerance).

FIG. 29A illustrates first projected user guidance markers 2910A-2910D. First projected user guidance markers 2910A-2910D are user guidance markers 2906A-2906D projected onto a first image plane (not illustrated) of the image capture device at first pose 2902A. In some embodiments, first projected user guidance markers 2910A-2910D are user guidance markers 2906A-2906D projected onto the first image plane of the image capture device at first pose 2902A from an optical center of the image capture device at first pose 2902A.

A first image is captured by the image capture device at first pose 2902A. The first image includes first projected user guidance markers 2910A-2910D that are within field of view 2912 of the image capture device at first pose 2902A. As illustrated in FIG. 29A, first projected user guidance markers 2910A-2910D are within field of view 2912 of the image capture device at first pose 2902A, and thus are captured in the first image.

The capture of the first image places user guidance markers 2906A-2906D within world coordinate system 2904 as first placed user guidance markers 2914A-2914D. First placed user guidance markers 2914A-2914D are user guidance markers 2906A-2906D projected onto a plane (not illustrated). In some embodiments, for example as illustrated in FIG. 29A, the plane including first placed user guidance markers 2914A-2914D is between the first image plane of the image capture device at first pose 2902A and infinity. In some embodiments, the plane including first placed user guidance markers 2914A-2914D is between the focal plane of the image capture device at first pose 2902A and the first image plane of the image capture device at first pose 2902A.

The image capture device transitions from first pose 2902A to second pose 2902B. First placed user guidance markers 2914A-2914D responsively transition to the image capture device transition from first pose 2902 to second pose 2902B at a disproportionate rate to the image capture device transition. As illustrated in FIG. 29B, first placed user guidance markers 2914A-2914D transition to second placed user guidance markers 2924A-2924D. In some embodiments, the transition of first placed user guidance markers 2914A-2914D to second placed user guidance markers 2924A-2924D is driven by augmented reality frameworks, such that translation changes of the camera within world coordinate system 2904 drive disproportionate translation changes of rendered content placed in world coordinate system 2904.

In such embodiments, the coordinate system the user guidance markers are projected in update from that of the image capture device to the world. Initial display and projection relative to first pose 2902A is updated to world coordinate system 2904 such that subsequent changes to the image capture device change the position of the user guidance markers in world coordinate system 2904. This is distinct from updating the rendering of fixed user guidance marker positions relative to a new pose of the image capture device. In such embodiments, first placed user guidance markers 2914A-2914D transition as a function of rendering frameworks of a real world coordinate system, as opposed to the projection framework of the cameras' focal planes of FIGS. 28A-28C.

In some embodiments, the translation of the image capture device along one axis induces rendering changes of first placed user guidance markers 2914A-2914D relative to an orthogonal axis. For example, as the image capture device translates left or right along the x-axis, the rendered content responsively changes as if the image capture device were approaching first placed user guidance markers 2914A-2914D along the y-axis (using the coordinate system illustrated in FIGS. 29A-29B).

FIG. 29B illustrates second projected user guidance markers 2920A-2920D. Second projected user guidance markers 2920A-2920D are second placed user guidance markers 2924A-2924D projected onto a second image plane (not illustrated) of the image capture device at second pose 2902B. In some embodiments, second projected user guidance markers 2920A-2920D are second placed user guidance markers 2924A-2924D projected onto the second image plane of the image capture device at second pose 2902B from an optical center of the image capture device at second pose 2902B.

As illustrated in FIG. 29B, second projected user guidance markers 2920C-2920D are within field of view 2922 of the image capture device at second pose 2902B.

In the embodiments discussed throughout, the changes in positions of the user guidance markers are responsive to translation changes of the cameras (i.e., the image capture devices), and changes in the user guidance markers positions out of the field of view of the new pose may still be displayed on the device if those cameras are rotated accordingly. The feedback protocols are such that the disproportionately larger translation changes of the user guidance markers than the translation changes of the image capture device ensure that rotations to bring the translated user guidance markers within the field of view of the translated image capture device preserve the intended subject of the panoramic image within the field of view only when the image capture device is within a translation tolerance.

Figure 30:
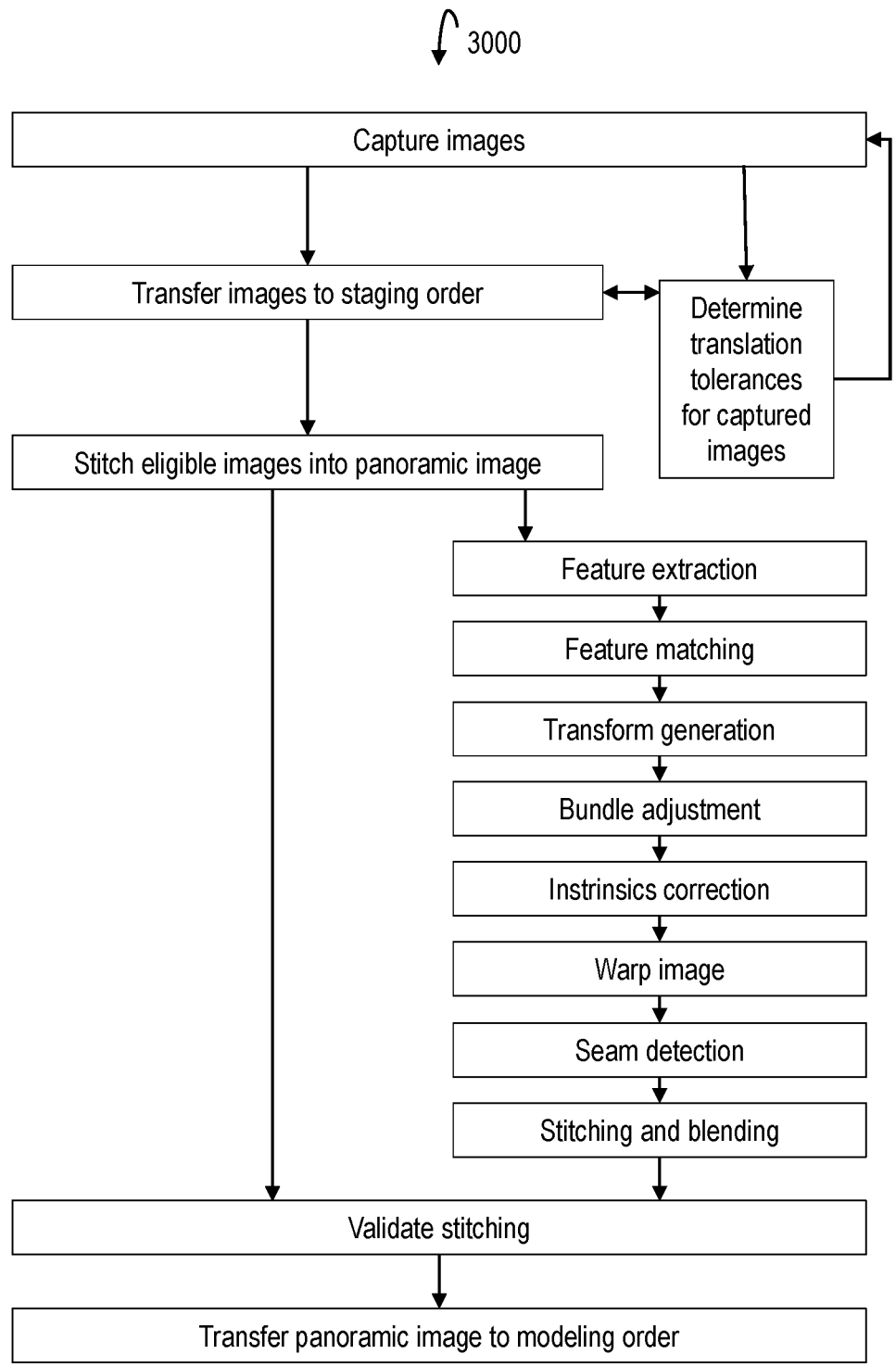
FIG. 30 illustrate a method for panoramic image stitching according to some embodiments.

FIG. 30 illustrates method 3000 according to an exemplary embodiment of panoramic stitching according the techniques described herein. Images are captured on a device, such as a smartphone and transferred to a staging order for initial processing. In some embodiments, initial processing is determining the distance to content within the images, and the changes in camera positions among the captured images. The distance to the content determines the permissible changes in camera positions of the received captured images, and those images that meet the translation requirements are identified as eligible for stitching.

In some embodiments, as images are captured, the translation tolerance is calculated from distance to content data collection, thereby providing a feedback loop back to the capture step for additional images to capture, or how much translation is permitted in a subsequent image. Only those images that meet the translation tolerance are transferred to a staging order.

Stitching eligible images into a panoramic may comprise any combination or order of substeps, to include identifying or extracting features across images, matching or corresponding those features to one another across images, generating image transforms to align the matched featured, calculating a bundle adjustment for efficient transforms of camera positions based on relevant features or planes within an image, correcting for any camera intrinsics such as distortion of focal length that may produce feature positional changes across images, warping the image according to the generated transform as may be refined by bundle adjustment and intrinsics correction, identifying content seams for stitching such as color gradients, aligning the images according to the seams and blending by adjusting image settings like exposure or brightness.

In some embodiments, warping is applied to an entire image. For example, for image pairs that have no translation changes, the entire image is transformed to match the features to the other image. In some embodiments, when there is a translation change between images, only certain features and their corresponding components are transformed. For example, if there is a translation change between an image pair, only the features of a first façade or planar surface of a first image are transformed to a second image. In this way, the second image is progressively built upon by individual planar elements of the subject content, and other features and planes otherwise captured in the first image are not stitched.

A stitched image is validated to ensure suitability for use in three dimensional reconstruction. For example, vanishing point detection is performed on the image to determine whether lines of single geometric features align to common vanishing points (or within a tolerance error of vanishing points). Referring back to FIG. 12B and the upper right artifact block, ridge line 1222 comprises two non-aligned segments that would extend to disparate vanishing points. In some embodiments, only when a feature's constituent lines converge to a substantially similar vanishing point or its constituent segments have substantially similar angular values is the image validated. In some embodiments, linear continuity is measured at seam areas (e.g., the ridge line of the upper right block in FIG. 12B) to determine if the line is broken or has segments with different orientations.

In some embodiments, a subimage is reprojected onto the panoramic image and a least squares analysis between the subimage's features and those features of the stitched image is performed to determine a reprojection error value in feature positions of the warped image. In some embodiments, if the stitching moves features of the subimages outside of a global tolerance threshold (10% in some embodiments), the image is not validated or the subimage is not accepted within the stitched panoramic. Referring again to FIG. 14A, though certain features of the far right subimage may undergo minor warping to align with features of other subimages, features on the railing have significantly warped and are distorted. In some embodiments, if the aggregate warp of such subimage exceeds a reprojection change for all features in excess of 10% the subimage is discarded from the stitched panoramic.

In some embodiments, validation is producing a panoramic image within a crop having a fixed aspect ratio (such as the camera aspect ratio) that fits the subject content (as shown by the white outline in FIG. 14B). In some embodiments, crop validation is performed by fitting a bounding box over a segmentation mask for the target class of the subject content, and sizing to fit the pixels of the target class (including any buffer portions) while excluding blank pixels (such as the black portions of FIG. 14A or B).

Lastly, a complete panoramic image, of total pixel information or cropped aspect information as described above with respect to validation, is submitted for use in three dimensional model generation.

Figure 31:
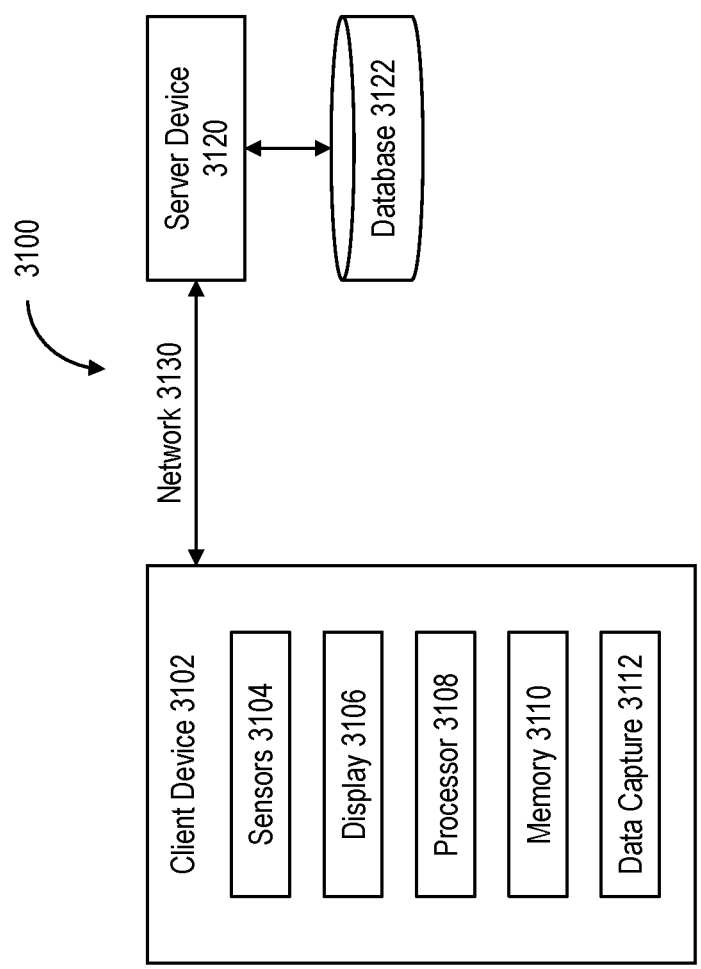
FIG. 31 illustrates an exemplary computer system for performing panoramic image stitching according to some embodiments.

FIG. 31 illustrates an example system 3100 for panoramic image stitching. In some embodiments, system 3100 comprises a client device 3102 and a server device 3120 communicatively coupled via a network 3130. Server device 3120 is also communicatively coupled to a database 3122. Example system 3100 may include other devices, including client devices, server devices, and display devices, according to various embodiments. For example, a plurality of client devices may be communicatively coupled to server device 3120. As another example, one or more of the services attributed to server device 3120 herein may run on other server devices that are communicatively coupled to network 3130.

Client device 3102 may be implemented by any type of computing device that is communicatively connected to network 3130. Example implementations of client device 3102 include, but are not limited to, workstations, personal computers, laptops, hand-held computer, wearable computers, cellular/mobile or smartphones, portable digital assistants (PDA), tablet computers, digital cameras, and any other type of computing device. Although a single client device is depicted in FIG. 31, any number of client devices may be present.

In FIG. 31, client device 3102 comprises sensors 3104, display 3106, processor 3108 which may execute instructions such as those stored in memory 3110 to perform the functionality as described throughout this disclosure for stitching images together for a panoramic image based on translation movement relative to the content's distance from client device 3102. Client device 3102 may further comprise data capture device 3112, such as a camera, LiDAR sensor, time of flight sensor or other scene gathering device for visual or spatial data.

Client device 3102 is communicatively coupled to display 3106 for displaying data of data capture 3112. Example implementations of a display device include a monitor, a screen, a touch screen, a projector, a light display, a display of a smartphone, tablet computer or mobile device, a television, and etc.

According to some embodiments, client device 3102 monitors and receives output generated by sensors 3104. Sensors 3104 may comprise one or more sensors communicatively coupled to client device 3102. Example sensors include, but are not limited to accelerometers, inertial measurement units, altimeters, gyroscopes, magnetometers, temperature sensors, light sensors, and proximity sensors. In some embodiments, one or more sensors of sensor 3104 are sensors relating to the status of client device 3102. For example, an accelerometer may sense whether computing device 3102 is in motion.

One or more sensors of sensors 3104 may be sensors relating to the status of data capture 3112. For example, a gyroscope may sense the degree that data capture 3112 is rotated about a vertical axis, or whether it is in landscape or portrait mode.

In some embodiments, generating panoramic images using the techniques described herein enhances reconstruction pipelines. In some embodiments, generating panoramic images using the techniques described herein system manipulations for modules, such as those of FIG. 31. In one example, generating panoramic images using the techniques described herein can save storage space in memory 3110 of client device 3102 by rejecting/deleting/not saving images that do not meet certain criteria. In another example, generating panoramic images using the techniques described herein can improve fidelity of output at server device 3120 which, in turn, can drive better reconstruction results. The panoramic image can be used for 3D reconstruction directly, or as part of a 3D reconstruction pipeline, for example, for localizing other cameras.

What is claimed is:

1. A method for stitching a panoramic image, the method comprising:
    receiving two or more candidate panoramic subimages;
    for each candidate panoramic subimage of the two or more candidate panoramic subimages:
        determining a camera position of a camera associated with the candidate panoramic subimage;
        determining a distance between the camera position and points of the candidate panoramic subimage; and
        classifying one or more points of the candidate panoramic subimage as far points based on the distance; and
    aligning the far points across the candidate panoramic subimages by warping the candidate panoramic subimages to create a stitched panoramic image, wherein warping the candidate panoramic subimages comprises warping each candidate to a registration plane such that the far points from each of the candidate panoramic subimages align on the registration plane.

2. The method of claim 1, wherein classifying the points of the candidate panoramic subimage based on the distance comprises:

for each point of the points of the candidate panoramic subimage:
comparing the distance between the camera position and the point to a threshold distance value.

3. The method of claim 2, wherein classifying the points of the candidate panoramic subimage based on the distance comprises:
responsive to the distance between the camera position and the point being greater than or equal to the threshold distance value, classifying the point as a far point.

4. The method of claim 2, wherein classifying the points of the candidate panoramic subimage based on the distance comprises:
responsive to the distance between the camera position and the point being less than the threshold distance value, classifying the point as a near point.

5. The method of claim 4, wherein aligning the far points across the candidate panoramic subimages comprises:
disregarding near points across candidate panoramic subimages.

6. The method of claim 1, wherein warping each candidate panoramic subimage to the registration plane comprises:
warping the candidate panoramic subimage to another candidate panoramic subimage.

7. The method of claim 1, wherein aligning the far points across the candidate panoramic subimages comprises:
extracting one or more features associated with the far points;
matching extracted features associated with the far points across the candidate panoramic subimages; and
aligning corresponding matched extracted features across the candidate panoramic subimages.

8. A system comprising:
one or more processors; and
one or more non-transitory computer-readable media storing instructions which, when executed by the one or more processors, cause performance of:
receiving two or more candidate panoramic subimages;
for each candidate panoramic subimage of the two or more candidate panoramic subimages:
determining a camera position of a camera associated with the candidate panoramic subimage;
determining a distance between the camera position and points of the candidate panoramic subimage; and
classifying one or more points of the candidate panoramic subimage as far points based on the distance; and
aligning the far points across the candidate panoramic subimages by warping the candidate panoramic subimages to create a stitched panoramic image, wherein warping the candidate panoramic subimages comprises warping each candidate to a registration plane such that the far points from each of the candidate panoramic subimages align on the registration plane.

9. The system of claim 8, wherein classifying the points of the candidate panoramic subimage based on the distance comprises:
for each point of the points of the candidate panoramic subimage:
comparing the distance between the camera position and the point to a threshold distance value.

10. The system of claim 9, wherein classifying the points of the candidate panoramic subimage based on the distance comprises:
responsive to the distance between the camera position and the point being greater than or equal to the threshold distance value, classifying the point as a far point.

11. The system of claim 9, wherein classifying the points of the candidate panoramic subimage based on the distance comprises:
responsive to the distance between the camera position and the point being less than the threshold distance value, classifying the point as a near point.

12. The system of claim 11, wherein aligning the far points across the candidate panoramic subimages comprises:
disregarding near points across candidate panoramic subimages.

13. The system of claim 8, wherein warping each candidate panoramic subimage to the registration plane comprises:
warping the candidate panoramic subimage to another candidate panoramic subimage.

14. The system of claim 8, wherein aligning the far points across the candidate panoramic subimages comprises:
extracting one or more features associated with the far points;
matching extracted features associated with the far points across the candidate panoramic subimages; and
aligning corresponding matched extracted features across the candidate panoramic subimages.

\* \* \* \* \*